United States Patent [19]

Kaneko et al.

[11] Patent Number: 5,349,656
[45] Date of Patent: Sep. 20, 1994

[54] TASK SCHEDULING METHOD IN A MULTIPROCESSOR SYSTEM WHERE TASK SELECTION IS DETERMINED BY PROCESSOR IDENTIFICATION AND EVALUATION INFORMATION

[75] Inventors: Seiji Kaneko, Yokohama; Toshiyuki Kinoshita, Sagamihara; Akio Yamamoto, Sagamihara; Yasuhisa Tamura, Sagamihara, all of Japan

[73] Assignee: Hitachi, Ltd., Tokyo, Japan

[21] Appl. No.: 797,912

[22] Filed: Nov. 26, 1991

[30] Foreign Application Priority Data

Nov. 28, 1990 [JP] Japan .................. 2-327627

[51] Int. Cl.⁵ .............................. G06F 9/445
[52] U.S. Cl. ................. 395/650; 364/230.3; 364/DIG. 1
[58] Field of Search ............... 395/800, 650, 375, 425, 395/725

[56] References Cited

U.S. PATENT DOCUMENTS

| | | | |
|---|---|---|---|
| 4,136,386 | 1/1979 | Annunziata | 395/425 |
| 4,394,731 | 7/1983 | Flusche | 395/425 |
| 4,400,770 | 8/1983 | Chan et al. | 395/400 |
| 4,442,487 | 4/1984 | Fletcher et al. | 395/425 |
| 4,445,174 | 4/1984 | Fletcher | 395/425 |
| 4,775,955 | 10/1988 | Liu | 395/425 |
| 5,109,512 | 4/1992 | Bahr et al. | 395/650 |
| 5,185,861 | 2/1993 | Valencia | 395/200 |

FOREIGN PATENT DOCUMENTS

| | | |
|---|---|---|
| 6451543 | 2/1989 | Japan . |
| 1133162 | 5/1989 | Japan . |
| 1205250 | 8/1989 | Japan . |

*Primary Examiner*—Alyssa H. Bowler
*Assistant Examiner*—John Harrity
*Attorney, Agent, or Firm*—Antonelli, Terry, Stout & Kraus

[57] ABSTRACT

A task scheduling method for a multiprocessor in a computer system having a main storage unit and a plurality of instruction processors each having a buffer storage unit, the buffer storage unit having a copy of a part of the main storage unit and deleting a part of the copy when reading a main storage unit area not stored in the buffer storage unit. The task scheduling method is accomplished by providing each task control block of a task control block queue with an area for storing processor identification of an instruction processor which executes a task and an area for storing evaluation information for evaluating a copied data amount for the task, remaining in the buffer storage unit of the instruction processor executing the task; causing the instruction processor to register the processor identification and evaluation information in the task control block when execution of the task is stopped; and when selecting a task to be executed by a subject instruction processor from a plurality of tasks to be executed in the computer system, causing the subject instruction processor to sequentially read task control blocks in the task control block queue to check each task in accordance with the processor identification and evaluation information, and if a checked result shows that the copied data amount corresponding to a checked task and remaining in the buffer storage unit of the instruction processor is greater than a predetermined amount, causing the subject instruction processor not to select the checked task and allowing another instruction processor to select the checked task.

12 Claims, 19 Drawing Sheets

FIG. 3A

| 10 TO 12 | TASK CONTROL BLOCK |
|---|---|
| 103 | PREVIOUS INSTRUCTION PROCESSOR NUMBER |
| 104 | PREVIOUS EXECUTION STOP TIME |
| 4 | BS OF INSTRUCTION PROCESSOR 1 |
| 501 | AREA OF BS OF INSTRUCTION PROCESSOR 1 USED BY TASK A |

FIG. 3B

| 5 | BS OF INSTRUCTION PROCESSOR 2 |
|---|---|
| 502 | AREA OF BS OF INSTRUCTION PROCESSOR 1 USED BY TASK B |
| 511 | AREA OF BS OF INSTRUCTION PROCESSOR 2 USED BY TASK A |

| 10 | TASK CONTROL BLOCK |
|----|--------------------|
| 11 | NEXT TASK CONTROL BLOCK |

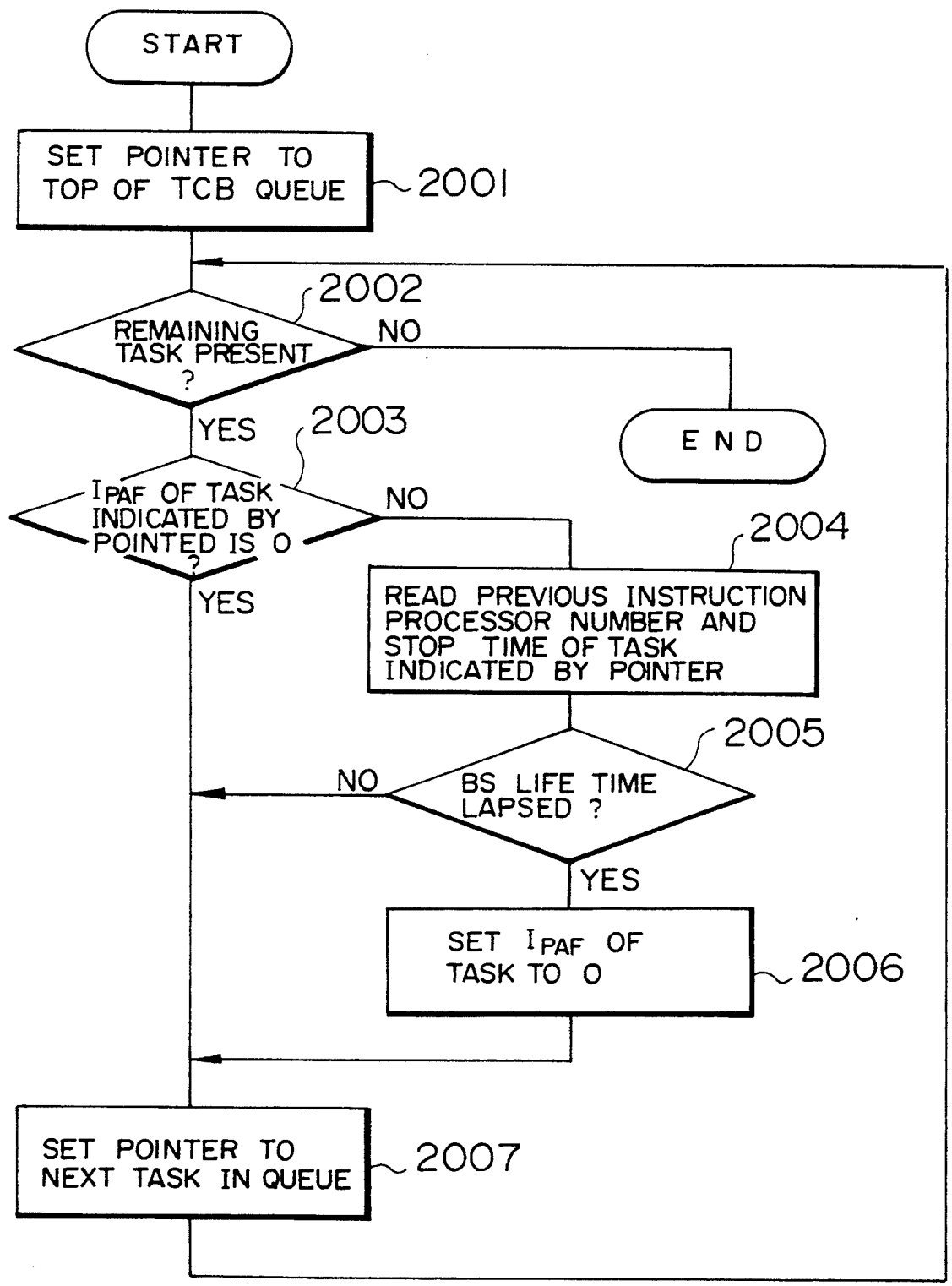

| 30 | TASK CONTROL BLOCK |
|----|--------------------|
| 31 | NEXT TASK CONTROL BLOCK |

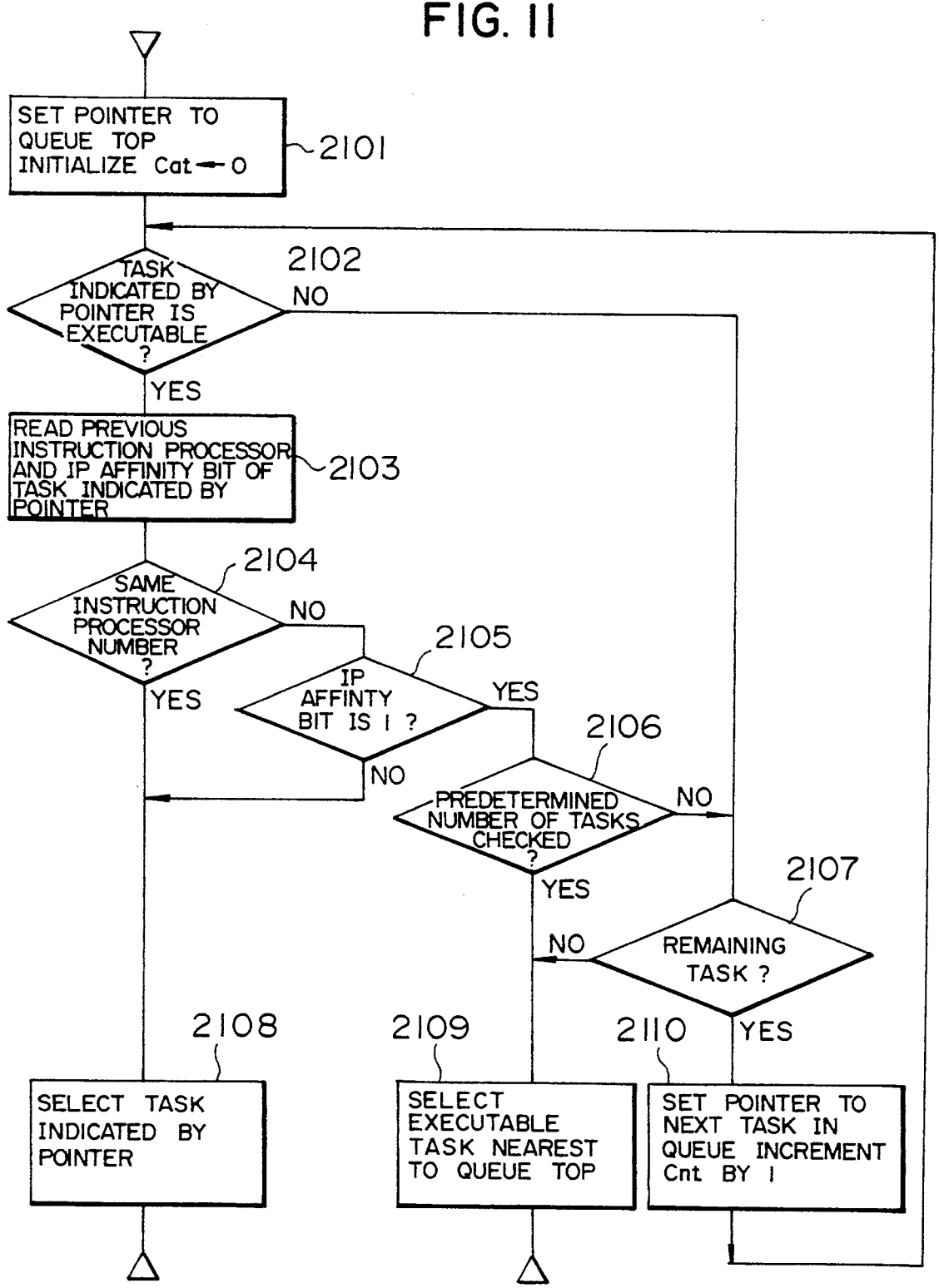

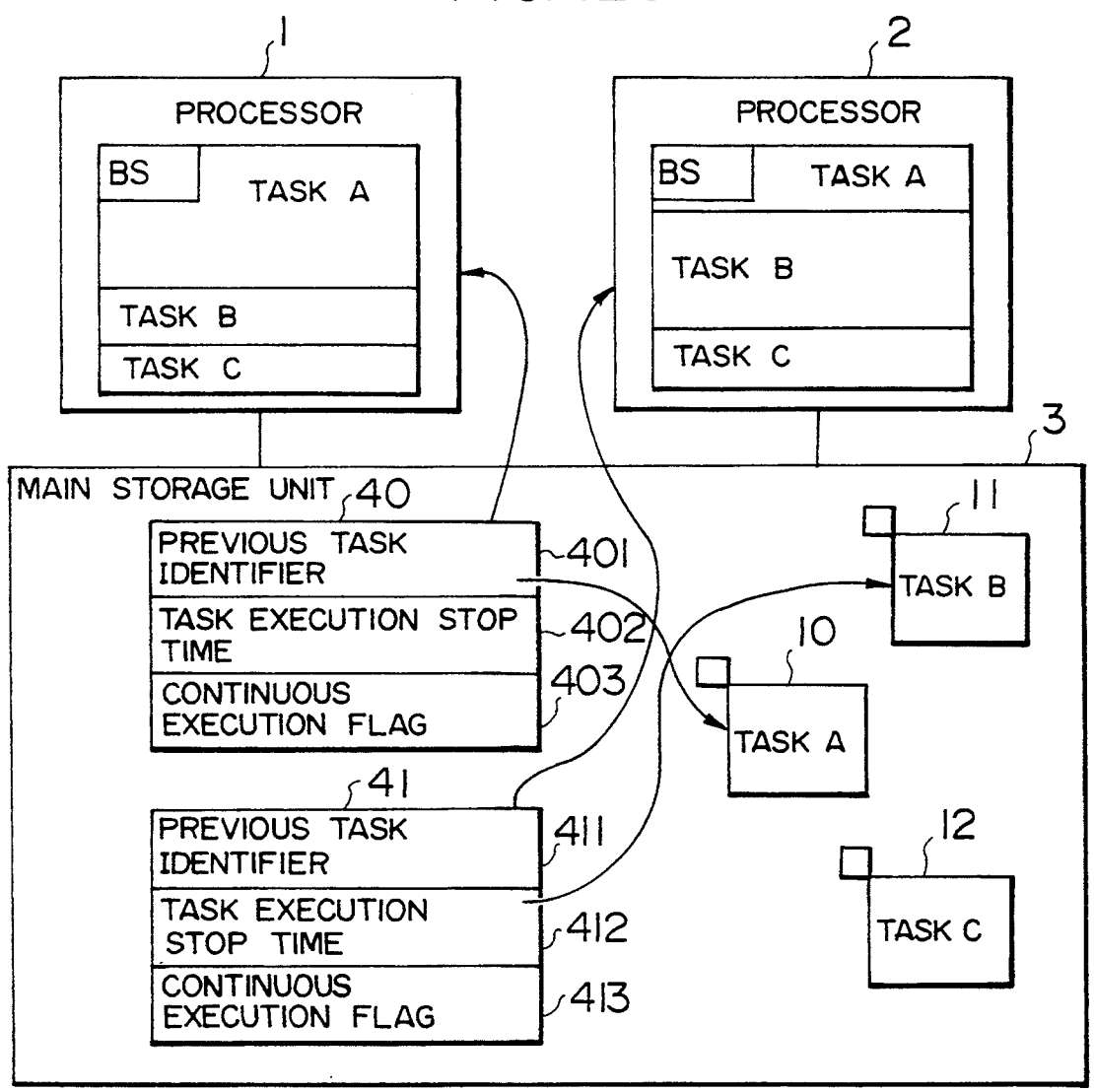

TASK SCHEDULING METHOD IN A MULTIPROCESSOR SYSTEM WHERE TASK SELECTION IS DETERMINED BY PROCESSOR IDENTIFICATION AND EVALUATION INFORMATION

BACKGROUND OF THE INVENTION

The present invention relates to a control method for an operation system of a multiprocessor having buffer storage units.

Recent large computers of high performance often use a tightly coupled multiprocessor system in which instruction processors share a main storage unit. There are known two task scheduling methods of allocating a plurality of tasks to instruction processors in such a multiprocessor system. One is a load sharing method wherein tasks are allocated to instruction processors in accordance with the load of each instruction processor. The other is a shared-by-features method wherein a specific task is executed concentrically by one or a plurality of dedicated instruction processors. The load sharing method allows each instruction processor to be executable until its busy rate reaches 100%, so that it is generally used for a tightly coupled multiprocessor.

The load sharing method for a tightly coupled multiprocessor system is realized by a task dispatching algorithm. Namely, tasks each constituting a software execution unit are sequentially stored in an execution wait queue. An idle instruction processor searches the wait queue and selects an executable task if any to execute it (such selection and execution is called "dispatch"). Consider now an execution stop by the task dispatching algorithm wherein a certain task running on an instruction processor is stopped by an external factor such as an interruption or an internal factor caused by task execution such as a call for an OS function. When OS designates a new task after executing necessary processes, this new task has been designated heretofore irrespective of the previous task the instruction processor executed. Furthermore, the time period from when a task was executed to when it is stopped, is not constant but depends on both the characteristics of the task and the system state.

Another related background art of the present invention is a technique regarding a buffer storage unit. As the amount of tasks to be executed by recent computers becomes large, the necessary capacity of a main storage unit becomes considerably large. There is a bargain between the capacity and the speed and power consumption of semiconductor memory devices of a main storage unit. Using a number of memory devices compatible with high speed instruction processors is not effective in cost, space, and power consumption. This problem is generally solved by providing each instruction processor with a buffer storage unit of low capacity and high speed, and by bypassing an access to a main storage unit of large capacity and low speed. Such a buffer storage unit uses memory devices smaller in capacity and higher in speed than those of the main storage unit, so the whole capacity of the buffer storage unit is relatively small. Use of such a buffer storage unit relies upon the characteristics that a program uses data which is present concentrically, as viewed in a short time span, within a specific memory space. Data read in the buffer storage unit is reused or replaced with new data. Specifically, data used at a certain time period is read in the buffer storage unit and the data not used is pushed out from the buffer storage unit. In some cases, data is written back to the main storage unit so that the whole necessary memory space can be assigned to the small buffer storage unit. There is also known a configuration of a high speed multiprocessor system wherein there is provided an intermediate buffer storage unit for reducing a large difference of process speed between each instruction processor and a main storage unit. Such a configuration is disclosed, for example, in U.S. Pat. No. 4,442,487, U.S. Pat. No. 4,445,194, and Japanese Patent Laid-open Publication JP-A-64-51543.

A multiprocessor system having such buffer storage units can operate at a high speed if data to be used, referred, or changed by an instruction processor is present within the buffer storage unit (such a case is called hereinafter "iNBS"). However, if data is not present in the buffer storage unit (such a case is called hereinafter "NiBS"), it is necessary to access a low speed main storage unit to refer to or change necessary data. In the latter case, the time period necessary for data processing becomes several to several tens times as longer as the former case. It is therefore important to increase the percentage of iNBS in order to improve the system performance. This technique has been studied in various ways as the main issue of a cache technique. For example, Japanese Patent Laid-open Publication JP-A-1-133162 discloses the technique for controlling not to store specific data in a buffer storage unit. Japanese Patent Laid-open Publication JP-A-1-205250 discloses the hierarchic structure technique for a buffer storage unit.

Another related background art of the present invention is a coherence control technique for buffer storage units of a tightly coupled multiprocessor. The contents of a buffer storage unit are a copy of part of the main storage unit. If a plurality of instruction processors operate to change data in the main storage unit at the same memory space, it is necessary to change data in the main storage unit without any contradiction and also to change data in the other buffer storage units. As a technique relevant to this, there is disclosed in U.S. Pat. No. 4,136,386 a method of configuring a system which controls a memory access from the above-described viewpoint. Specifically, according to this method, there are disclosed various techniques for transferring data to be changed and stored in the main storage unit, between other buffer storage units. U.S. Pat. No. 4,775,955 discloses a coherence control method for data in buffer storage units which method uses software.

In a tightly coupled multiprocessor system using a load sharing control method described above, when a task running on an instruction processor is stopped by an external factor or an internal factor caused by task execution such as a call for an OS function, the data in the main storage unit used by the task is being stored at the instruction processor or the system buffer storage unit. If the task becomes again executable, an instruction processor to execute the task has been selected heretofore regardless of the instruction processor which previously executed the task. If the newly selected instruction processor differs from the instruction processor which previously executed the task (hereinafter called "previous instruction processor"), the data stored at the previous instruction processor becomes wasteful. Furthermore, if a different instruction processor executes the task, it becomes necessary to perform the above-described coherence control in order to make the contents of the main storage unit and buffer storage unit to be coincident with each other, on condition that data was written in the main storage unit. Therefore, the execution performance of the previous instruction processor lowers.

SUMMARY OF THE INVENTION

It is an object of the present invention to solve the problem of low execution performance which might be caused when the same task is again executed by an instruction processor different from the previous one, and to provide a technique for selecting an instruction processor which can execute the task while maximizing the efficiency of the buffer storage unit.

In order to solve the above problems, the present invention provides a technique for determining an instruction processor to which a task is allocated, in accordance with the results of evaluation of the utilization of each buffer storage unit of the instruction processor. In order to realize this task scheduling technique, there are provided the following two technical means.

(1) The area of the buffer storage unit of an instruction processor usable by a task is directly or indirectly estimated. If the estimated area value is equal to or larger than a threshold value, the task is allocated to the instruction processor.

(2) If the estimated area value of each buffer area of all instruction processors usable by the task is smaller than the threshold value, an optional instruction processor among idle processors is selected and assigned the task.

The first technical means is a process which is performed in order to efficiently use a buffer storage unit, and the second technical means is a process which is performed in order to quickly establish load sharing. It is necessary to provide a method of directly or indirectly obtaining an evaluation value representative of the amount of data for a task stored in the buffer storage unit of each instruction processor. Strictly speaking, the evaluation value suitable for realizing the efficient use of a buffer storage unit and the quick establishment of load sharing, is not the amount of data in each buffer storage unit, but an index capable of comparing the amounts of data in a plurality of buffer storage units. The evaluation value is calculated using evaluation information. In order to calculate an evaluation value, the present invention provides the following two technical means.

(1) A dedicated hardware interface is provided. The data amount is detected from hardware and is used in calculating an evaluation value, the data amount constituting the evaluation information.

(2) There is registered a time (stop time) when an instruction processor last executed a task. The amount of data in the buffer storage unit is estimated using the registered time which constitutes the evaluation information, in accordance with an evaluation equation derived from the lapse time from the stop time and the characteristics of the task. The evaluation equation may be derived, for example, from the lapse time from the stop time.

The above-described technical means may be extended as in the following. If there is a system resource common to some tasks, the similarity between tasks can be defined by the resource they use. In a system which performs formatted processes, the similarity between tasks can be preset by designers. In this case, the similarity between data stored in a buffer storage unit and data to be used by a task may be evaluated from a time sequence of tasks to be executed by the instruction processor, and from an estimation equation regarding a degradation of buffer storage efficiency during a predetermined lapse time from the stop time. The evaluation results are used for obtaining the above-described evaluation value.

The following two advantageous effects are obtained when allocating a task in the manner described above.

(1) If a task was executed by an instruction processor, data stored in its buffer storage unit can be efficiently reused. In addition, it is possible for another instruction processor to efficiently use the same data stored in the buffer storage unit of the first-mentioned instruction processor. As a result, the reuse efficiency of data in a buffer storage unit can be improved and a probability that data is present within a buffer storage unit can be made high.

(2) The amount of data to be used by a task and stored in buffer storage units of instruction processors other than a selected instruction processor is less than the data amount in the buffer storage unit of the selected instruction processor. Therefore, influence of buffer storage coherence control relative to other instruction processors can be suppressed small.

Accordingly, it is possible to reduce an overhead caused by degraded utilization of buffer storage units during task scheduling.

BRIEF DESCRIPTION OF THE DRAWINGS

FIGS. 3A to 3C are diagrams explaining the advantageous effects obtained by the algorithm shown in FIG. 1;

FIG. 9 is a flow chart showing a process of clearing an IP affinity bit to 0 according to the second embodiment of the present invention;

FIG. 11 is a flow chart showing a process of selecting a task according to the second embodiment of the present invention;

FIGS. 12A to 12C are conceptual diagrams showing previous task tables according to the third embodiment of the present invention;

DESCRIPTION OF THE PREFERRED EMBODIMENTS (I) 1st Embodiment

Figure 1:
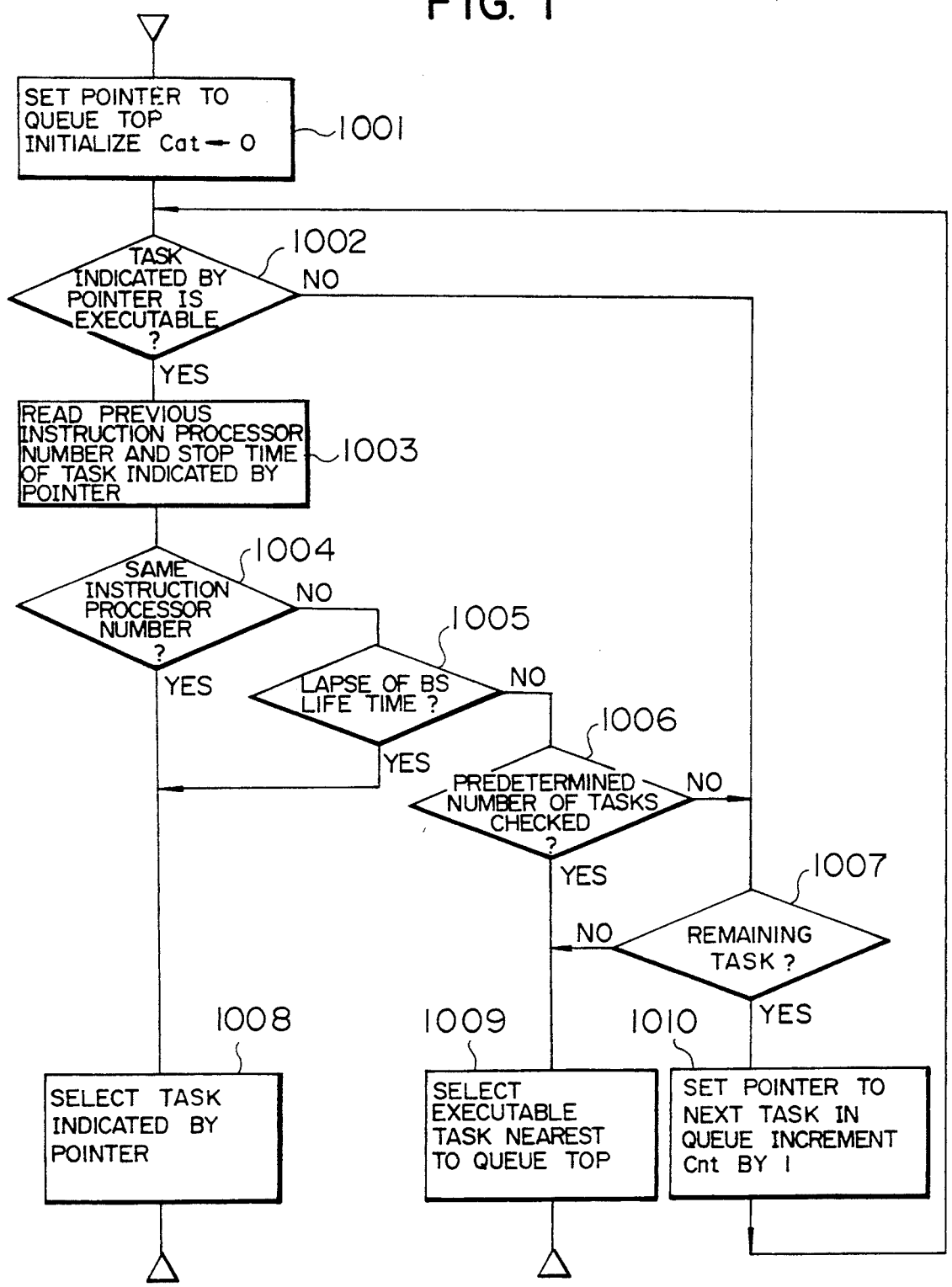
FIG. 1 is a flow chart showing a process of allocating an optional ready task to an instruction processor.
Figure 2:
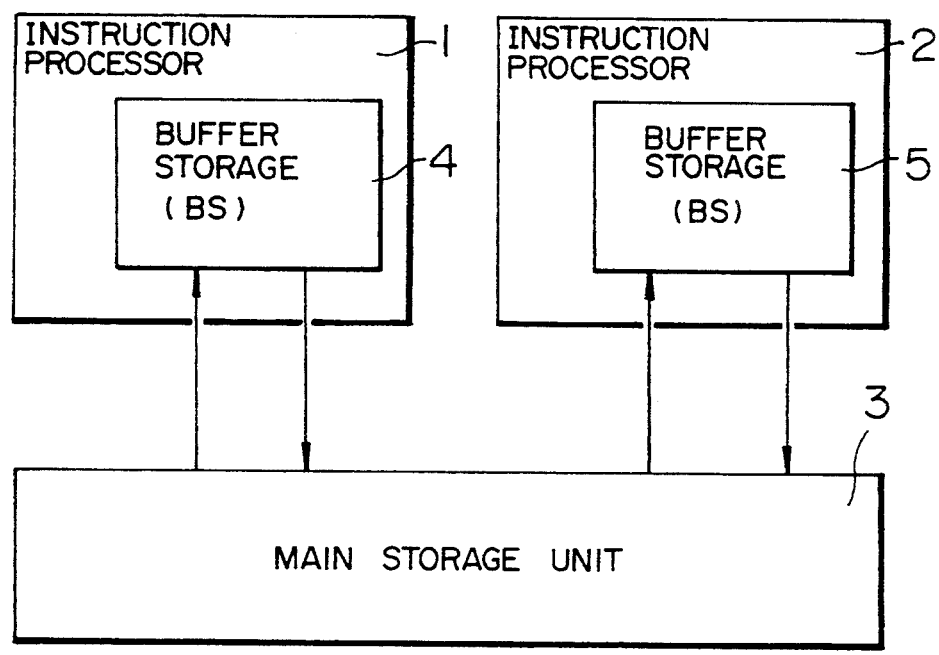
FIG. 2 shows an example of a computer system which executes the process shown in FIG. 1.
Figure 3C:
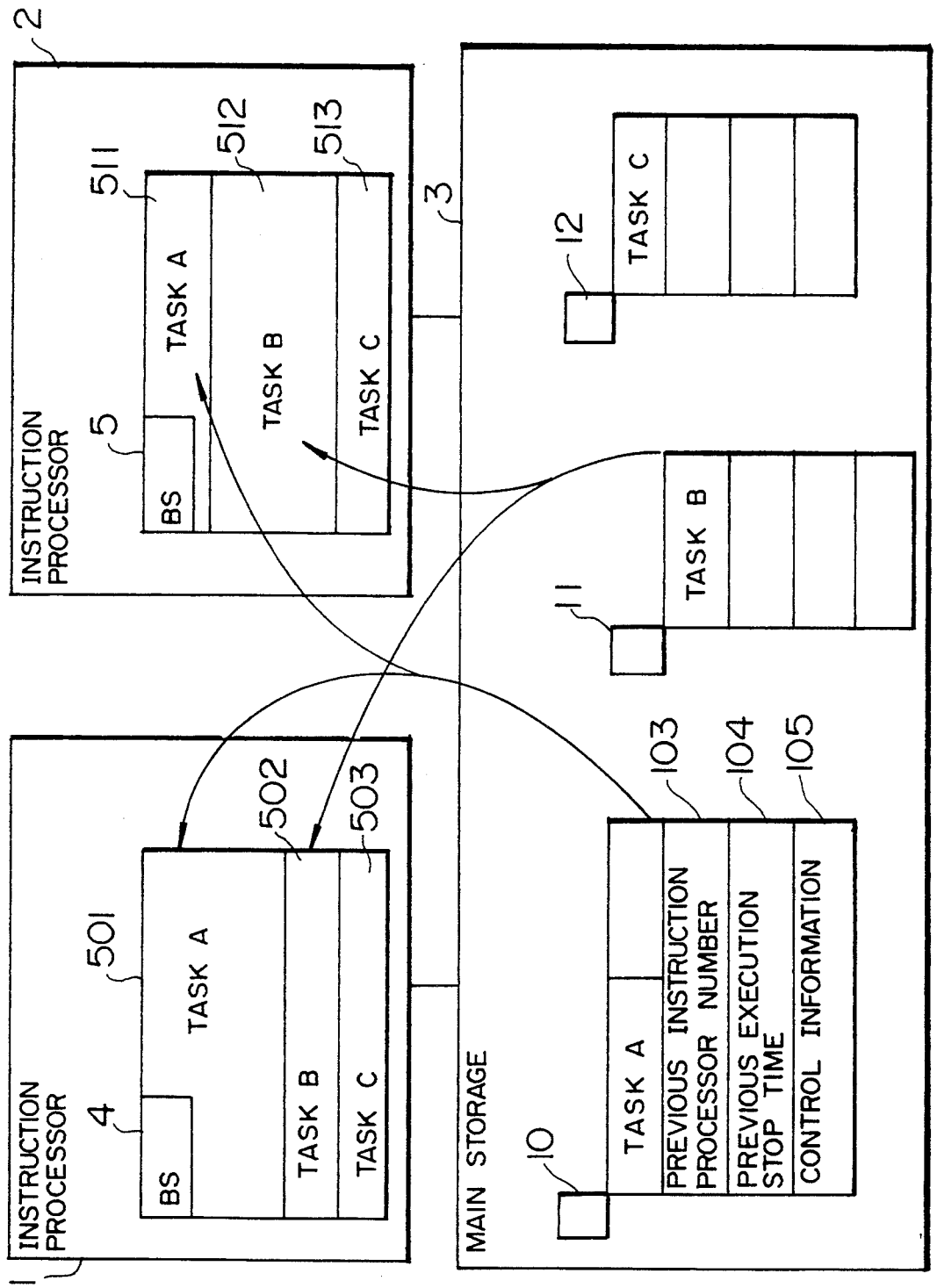
Figures 4A, 4B:
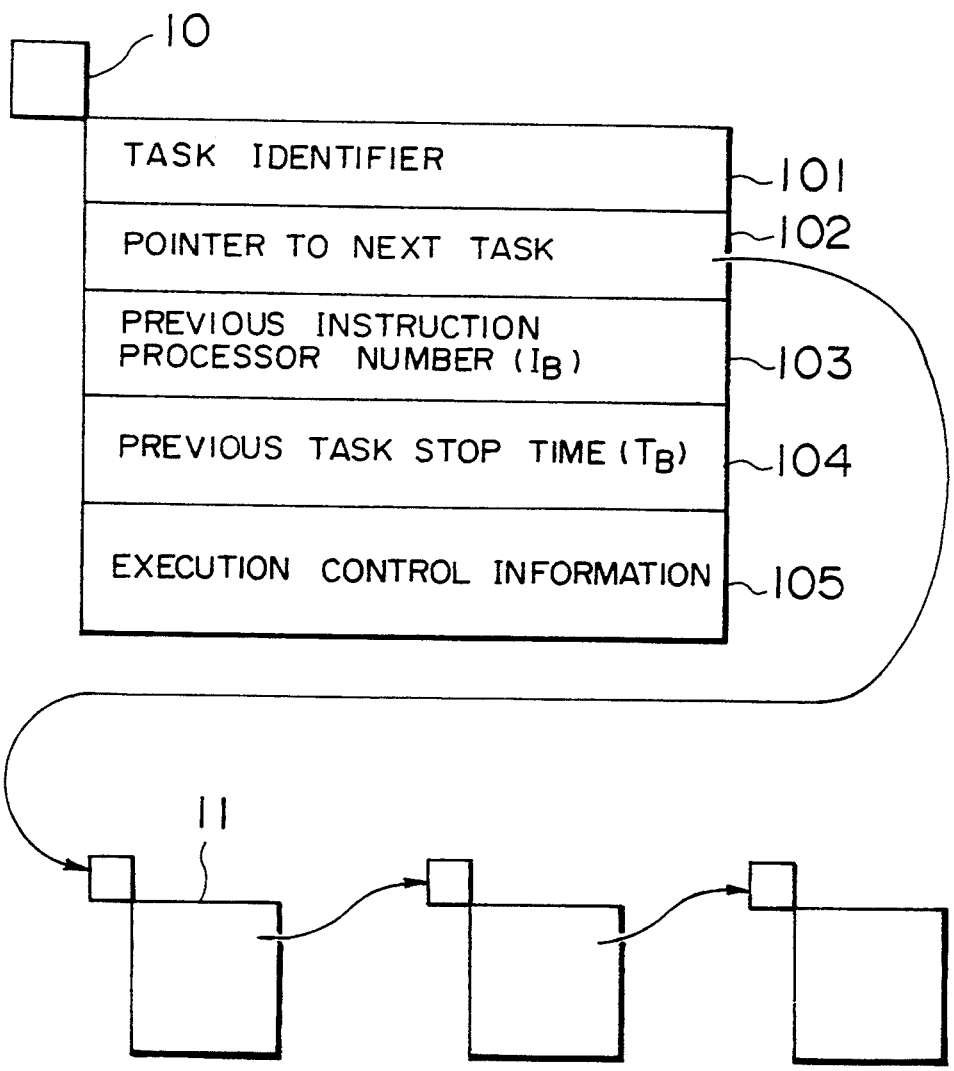
FIGS. 4A and 4B show the structure of a task control block (TCB) queue used in the embodiment.
Figure 5:
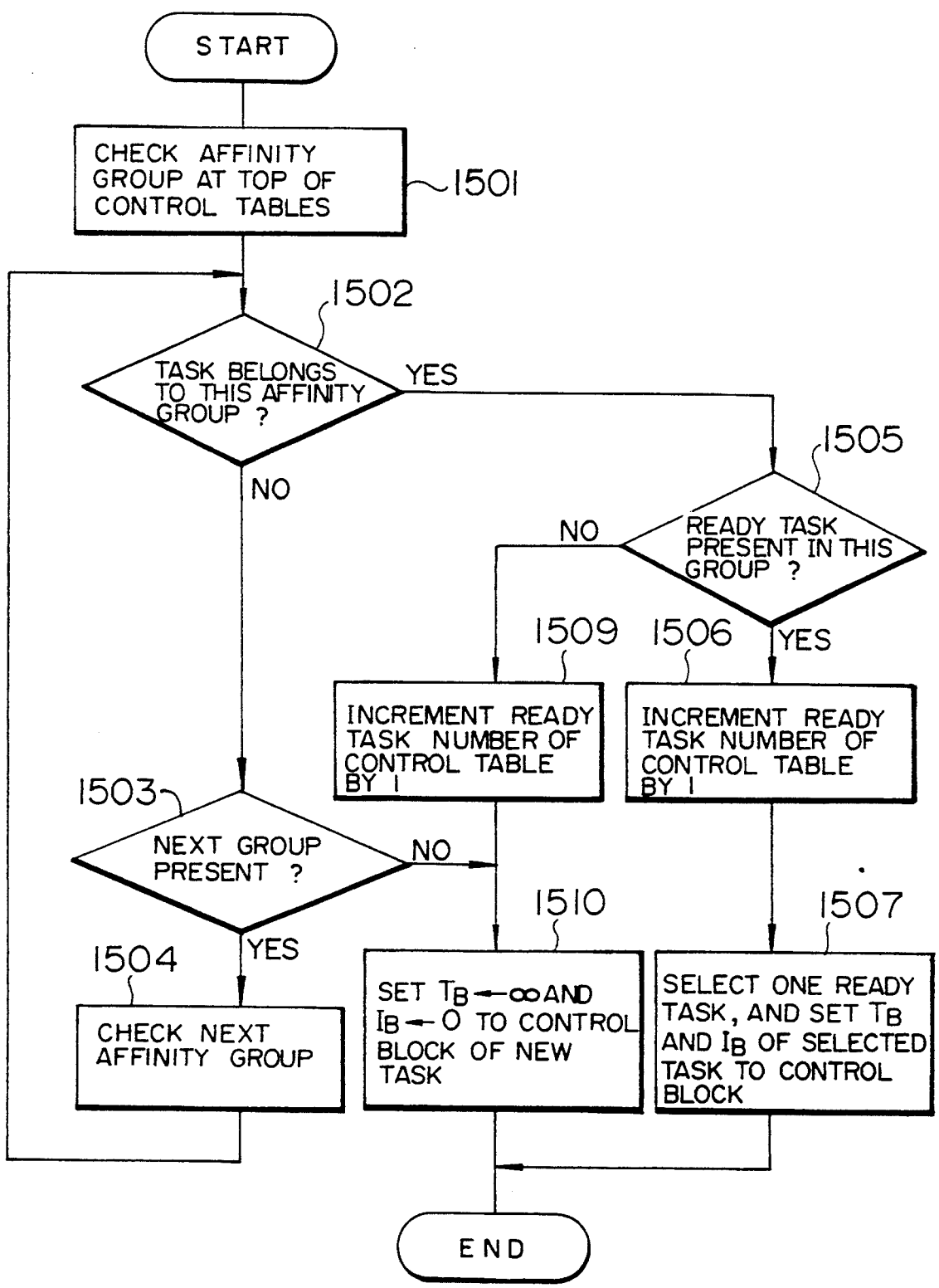
FIG. 5 is a flow chart showing a pre-process necessary for connecting a newly registered task to the queue shown in FIGS. 3A to 3C to execute the process shown in FIG. 1.
Figure 6:
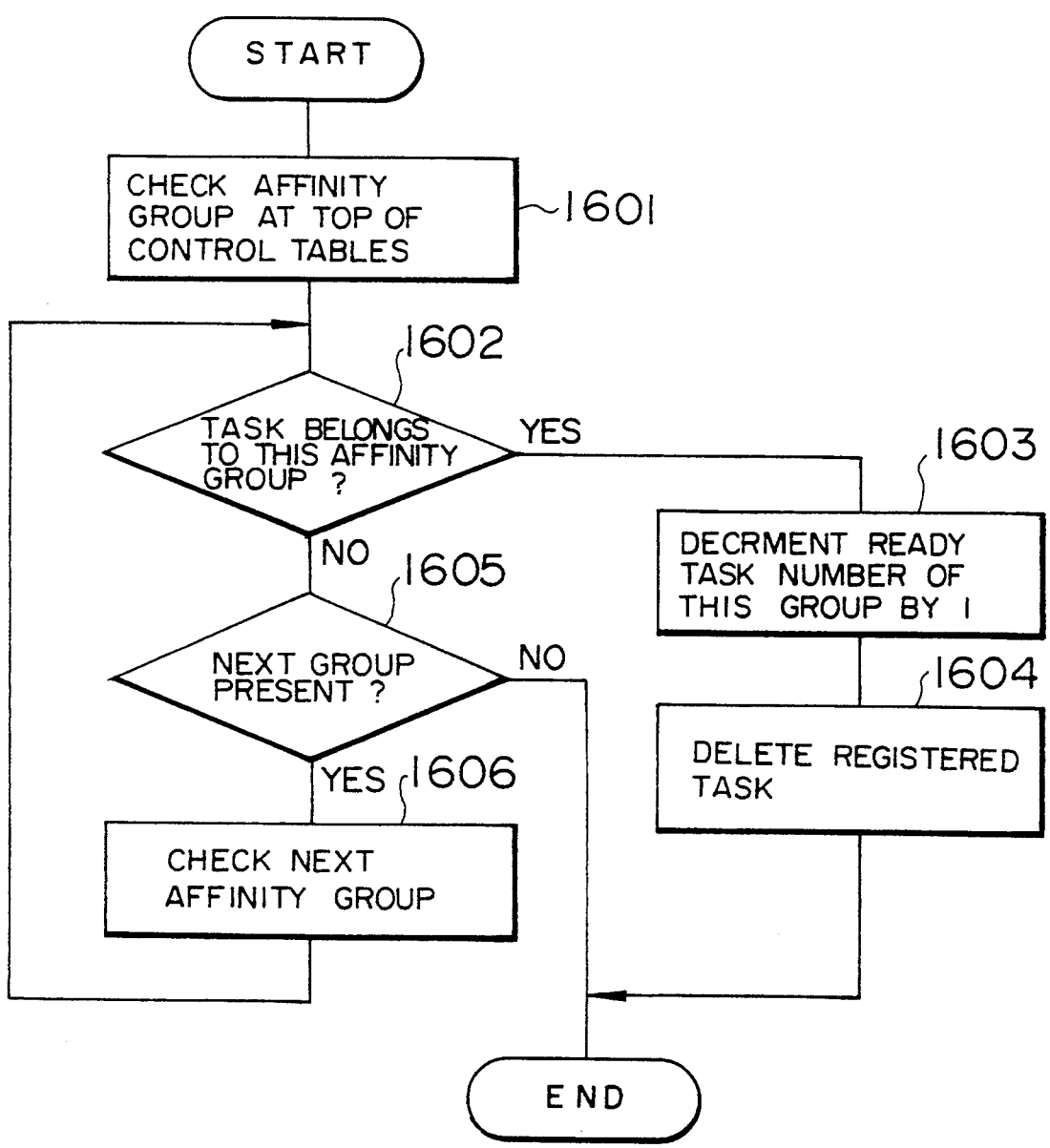
FIG. 6 is a flow chart showing a post-process for removing an executed task from the queue shown in FIGS. 4A and 4B.
Figure 7:
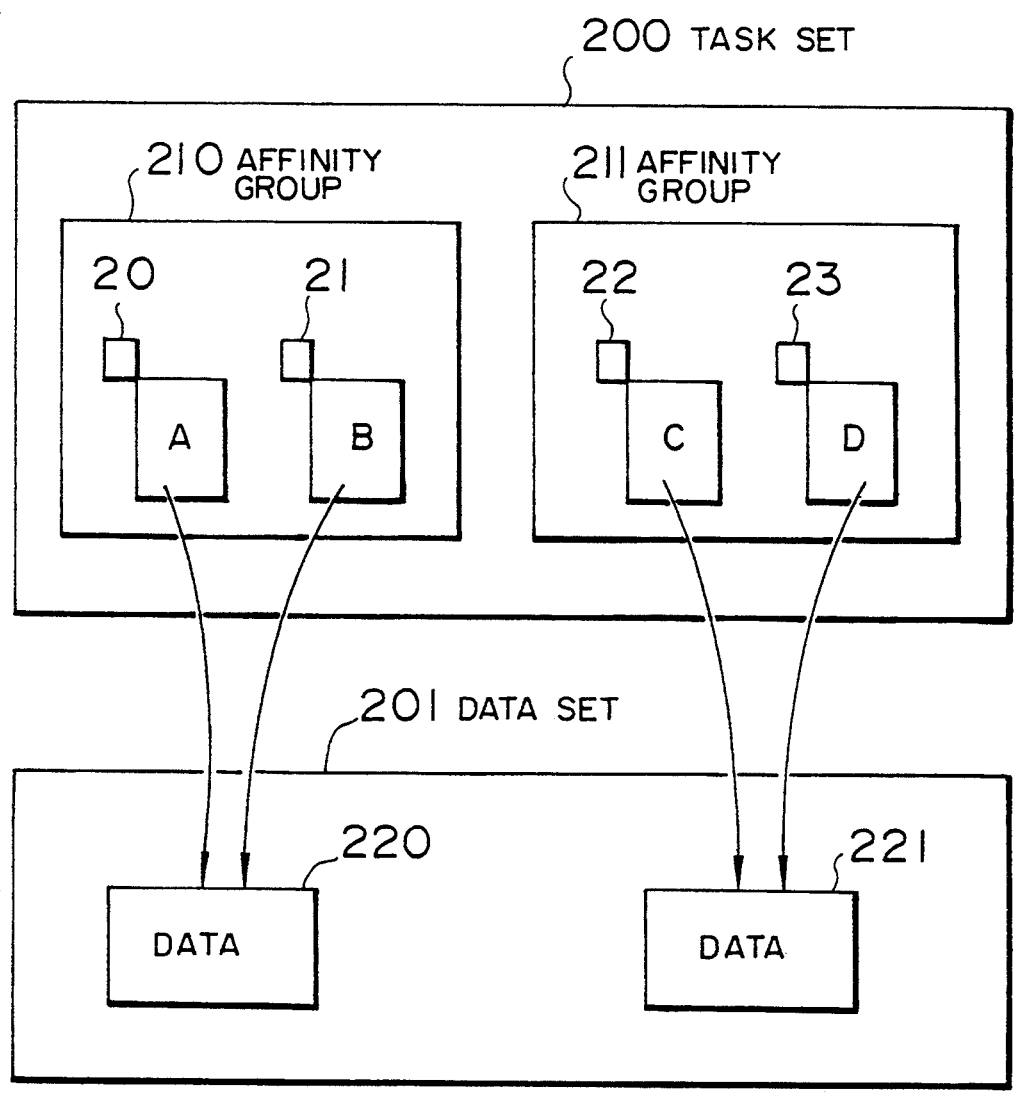
FIG. 7 illustrates affinity groups.
Figure 8:
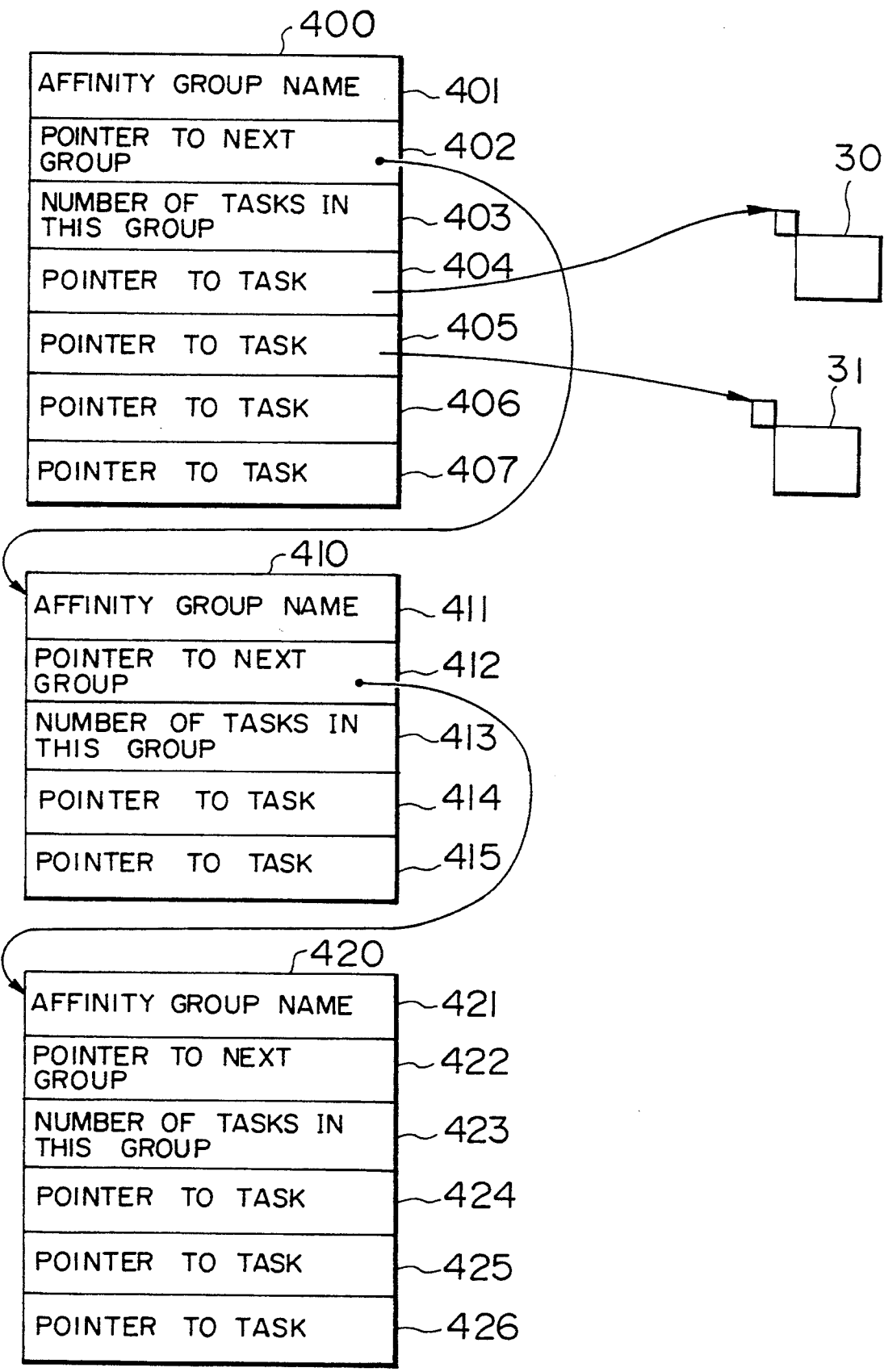
FIG. 8 shows the structure of an affinity group control table for storing affinity groups, the table being used at the post-process shown in FIG. 5.

A first embodiment of the present invention will be described with reference to the accompanying drawings. FIG. 1 is a flow chart showing a process of allocating a desired task in a ready state to an instruction processor, and FIG. 2 shows an example of a computer system for executing the process shown in FIG. 1. Various processing programs to be described hereinunder are stored at each of instruction processors 1 and 2. FIGS. 3A to 3C illustrate the advantageous effects of the algorithm shown in FIG. 1. FIGS. 4A and 4B show the structure of a task control block (TCB) queue of the first embodiment. The task control block is stored in a main storage unit. FIG. 5 is a flow chart showing a pre-process necessary for connecting a newly registered task to the queue shown in FIGS. 3A to 3C to execute the process shown in FIG. 1. FIG. 6 is a flow chart showing a post-process for removing an executed task from the queue shown in FIGS. 4A and 4B. FIG. 7 illustrates affinity groups. FIG. 8 shows the structure of an affinity group control table for storing affinity groups, the table being used at the post-process shown in FIG. 5.

First, a computer system shown in FIG. 2 and used in this embodiment will be described. This system has two instruction processors 1 and 2 each having a dedicated buffer storage unit (hereinafter called a BS) 4, 5. The instruction processors 1 and 2 are connected to a main storage unit 3. The buffer storage unit in each instruction processor is controlled in the manner described below.

The instruction processor 1 reads an instruction from the main storage unit, reads data from a main storage unit address space in order to execute an instruction, or writes data in a main storage unit address space. These three operations are collectively called a main storage unit access. At this main storage unit access, it is first checked whether BS4 contains subject data copied from the main storage unit address space (hereinafter simply called a target data). If the target data is present, the main storage unit access is carried out relative to BS4.

If the target data is not present in BS4 (such a case is called hereinafter as NiBS) or if data is to be written in the main storage unit 3 while BS4 is controlled by a store-through method, a request for a main storage unit access is sent to the main storage unit 3 to which the instruction processor 1 is connected. When BS is in an NiBS state, a main storage unit access request is sent to the main storage unit 3 for transfer, from the main storage unit 3 to BS, of a copy of main storage data having a predetermined data size inclusive of the target data (hereinafter called a block). Upon reception of a data read request, the main storage unit 3 reads necessary data from a predetermined area and transfers it to BS4 of the instruction processor 1. Upon reception of a data write request, the main storage unit 3 writes necessary data over a predetermined area. The instruction processor 1 uses the transferred data for a predetermined instruction fetch or calculation, and registers the data in BS4 so as to be ready for reuse.

In the computer system of this embodiment having the above-described structure and being controlled in the manner described above, each time a task uses data in the main storage unit, the data is registered in the buffer storage unit if necessary. Therefore, among the data used by a task, the amount of new data registered in the buffer storage unit gradually increases. On the other hand, old data already registered in the buffer storage unit is gradually pushed out as new data is registered therein, so the amount of old data gradually decreases. In order to efficiently improve the performance of a computer system having buffer storage units such as shown in FIG. 2, the utilization of buffer storage units is enhanced by reusing data in the buffer storage units and by reducing the number of data transfers between the main storage and buffer storage units, to thereby reduce a data transfer overhead.

An embodiment of a task scheduling method of the present invention applied to the system shown in FIG. 2 will be described. In this embodiment, a timer function to indicate the present time is provided without using hardware dedicated to the processes of the present invention. Therefore, this embodiment is applicable to a general computer system having a timer function.

For the purpose of simplicity of description, it is assumed that a task state takes one of three states, i.e., a running state, a ready or executable state, and a suspended state. If an attribute of each task regarding the priority order group is introduced, a task is selected considering each priority order group, by using an algorithm similar to that of the present invention.

First, there will be described a process wherein an instruction processor of the computer system shown in FIG. 2 selects a ready state task, the process being shown in the flow chart of FIG. 1. This process is executed when an idle instruction processor selects a new task. A task is selected in accordance with the procedure described below.

In the following description, attention is paid to BS4 and BS5 of instruction processors shown in FIGS. 3A to 3C. If an instruction processor executes another task B11 after executing a task A10, it stores data for a task B into its buffer storage unit. Therefore, it can be considered that data for the task A10 already stored in the buffer storage unit at the start of executing the task B is pushed out from BS and the data amount decreases generally monotonously. As shown in FIGS. 3B, it is assumed that at a certain time instant, data 501 and 511 used by the task A10 is stored more in BS4 of the instruction processor 1 than BS5 of the instruction processor 2, and data 502 and 512 used by the task B11 is stored more in BS5 of the processor 2 than BS4 of the processor 1. In this case, a better utilization of buffer storage units can be obtained if the task B11 is executed next by the instruction processor 2. The reduction rate of data amount is dependent upon the characteristics of two tasks A and B. In this embodiment, these tasks are allocated by estimating or evaluating average memory usage of the tasks. The evaluation is performed as below: the data amount in a buffer storage unit is estimated from a lapse time from a task execution stop time constituting evaluation information. Then, a threshold value of the lapse time from the task execution stop time is generated, which value ensures a sufficient buffer reuse effect. If a task is to be executed again within the time lapse shorter than the threshold value, there is selected an instruction processor which ensures a reuse of data in the buffer storage unit as much as possible. In this manner the task scheduling process shown in FIG. 1 is carried out.

The process shown in FIG. 1 will be described. In this process, there is prepared a TCB queue storing task control information or blocks (TCB) and having the structure shown in FIGS. 4A and 4B. An idle instruction processor selects one of executable tasks from the TCB queue in accordance with the following procedure. Each TCB 10, 11 stores therein, in addition to control information necessary for task execution, the number $I_B$ 103 of an instruction processor which executed the previous task, and a time $T_B$ 104 of execution stop of the previous task. This data is written when executing a post-process after task stop such as an interruption process, a macro process, or the like.

Referring to FIG. 1, the process of selecting a task to be executed will be described sequentially one step after another.

(1) First, a pointer is set to the top of the TCB queue. A work variable Cnt is initialized to 0. This variable is used for limiting the number of executions of a dispatch processing. Namely, this variable stores the number of checked blocks in the TCB queue, and the process of optimizing the task scheduling is terminated at a predetermined number of executions. (Step 1001)

(2) The task control block identified by the pointer is checked. If the task is not executable or not ready, it cannot be selected and executed. In this case, the flow branches to a step of checking the next task. (Step 1002)

(3) Next, the fields of the previous task stop time $T_B$ 104 and the previous instruction processor number $I_B$ 103 are read from the task control block 10 identified by the pointer. (Step 1003).

(4) The previous instruction processor number $I_B$ 103 read at Step 1003 is compared with the number of the instruction processor now in concern. If they are the same, this task is selected and the flow branches to a task execution process. (Steps 1004 and 1008)

(5) If the comparison result at Step 1004 shows that both the numbers are different, a difference between the present time and the previous task stop time $T_B$ 104 is checked. If the difference is equal to or less than a predetermined threshold value (Lim 1) determined from the life times of BSs, this task 10 is not selected and the flow advances to a process of checking the next task. The task determined not to be selected at Step 1005 was executed by another instruction processor, the lapse time from the execution stop time of this task not exceeding the time period corresponding to the threshold value. In the buffer storage unit of this instruction processor, there remain many copies of main storage areas. If the task determined not to be selected, is selected and executed, it is not possible to use the copies of main storage areas remaining at the other instruction processor. Furthermore, if data is written in those main storage areas, the coherence control process is required to be executed for the buffer storage unit of the other instruction processor. Thus, the process performance is degraded. Such a task not selected is stored in the TCB queue so that the previous instruction processor can be selected later when it becomes idle. (Step 1005)

(6) The following steps are related to checking the next task without selecting the task at Step 1005. The number of checked tasks is first obtained from the variable Cnt. If the variable Cnt is equal to or more than a preset upper limit of the check number, then the task searching operation is terminated, and the executable task nearest to the top of the TCB queue is selected. The reasons for selecting the executable task nearest to the top of the TCB queue are as follows. If such an executable task is selected, the impartiality of FIFO can be ensured and a task can be prevented from suspension within the queue. In addition, if the executable top task is selected, disturbance of the buffer coherence control to other instruction processors can be considered minimum, because such a task is oldest among executable tasks. (Steps 1006 and 1009)

(7) If there is no task to be checked, then the executable task nearest to the top of the queue is selected. The reasons for selecting the executable task nearest to the top of the queue are the same as those described above. (Step 1007)

(8) The pointer is set to the next task, and the variable Cnt is incremented by 1. Thereafter, the steps starting from Step 1002 are repeated. (Step 1010)

The steps of the flow chart shown in FIG. 1 have been described. A process to be performed when there is no executable task in the task queue is omitted from the flow chart for the purpose of brevity. This process is used by adding it after Step 1010. The process operates to detect that all tasks have been checked, and to make an instruction processor wait for an executable task. In the above embodiment, there is no execution priority order between tasks. The execution priority order may be easily realized, for example, by providing a TCB queue for each priority order.

In the task stop process, the task stop time is written in the previous task stop field $T_B$ 104, and the previous instruction processor number is written in the previous instruction processor $I_B$ 103. The stopped task is registered in the TCB queue as an executable task or suspended task depending upon the cause of task stop.

The search termination value Clim in the above algorithm depends upon the number of instruction processors and the occurrence frequency of task stop. The search termination value may be set about several times as large as the number of instruction processors, in order to ensure the advantageous effects of the present invention. The number of tasks whose data can be stored in a buffer storage unit at a time, depends on the system. Generally, the number of tasks storing data in a buffer storage unit is several. Consider the case where the number of executable tasks within a system is greater than the number of instruction processors multiplied by the number of tasks storing data in a buffer storage unit. In such a case, even if impartial services are intended for all tasks, a task is not allowed to execute so long as another task has its data in a buffer storage unit. In the process shown in FIG. 1, if there is no satisfactory task after checking the predetermined number of tasks, it means that a number of executable tasks are present in the TCB queue and that a number of tasks in a wait state are present in the system. The process of this embodiment aims at improving the system throughput by improving the buffer storage effect. However, there is a possibility of a task suspension under the condition that the same task is repeatedly executed and that there is a number of tasks in a wait state, i.e., an overload state. Under such a condition, it is better not to select the same task from the viewpoint of processing impartiality. There is a great possibility that a previous task executed by an instruction processor is found while checking executable tasks a certain number of times corresponding to about the number of instruction processors. In consideration of such a case, in the flow chart shown in FIG. 1, the executable top task is selected for fear that the previously executed task is again selected. If the search termination number is set small, the task execution wait time is shortened and the response time is shortened. However, the buffer storage effect is lessened and the throughput is degraded.

The life time (Lim 1) of BS used in the above-described process is dependent upon the characteristics of tasks running on the system, the capacity of BS, the system architecture, and the like. Therefore, each system has a particular life time. If the life time is set short, data in a buffer storage unit may not be used degrading the buffer storage efficiency. On the contrary, if the life time is set long, the number of task transitions becomes small because the probability of executing the same task becomes small. As a result, the task execution wait time becomes long. As a practical method, an optimum life time is set as one parameter of an operating system (OS) and optimized by measuring the buffer storage efficiencies and task execution wait times. Since the life time has a wide range within which the system performance is not degraded, a standard life time for a particular system may by set on the side of an OS vendor.

Next, there will be described a process of allocating a newly registered task to an instruction processor of the computer system shown in FIG. 1, with reference to the flow chart of FIG. 5. In this process, tasks are divided into a number of task groups each sharing common data. An instruction processor is determined for each task group so as to execute a task with a highest buffer storage effect.

In this process, a new task is coupled to the TCB queue while setting values of the previous task stop time field $T_B$ 104 and previous instruction processor number field $I_B$ 103. In the following description, it is assumed that information of shared data between tasks is given beforehand. The information of shared data between tasks can be obtained by checking data of each task using a complier and linker. A certain type of system allows to have in advance the brief characteristics of tasks running thereon. Such systems include, for example, a data base information retrieval system, and an on-line system mainly executing formatted processes. In such a system, loads are processed by running a number of sub-systems using respective virtual spaces. Therefore, it can be considered that a work area within the virtual space of each sub-system will not overlap another virtual space. It is therefore possible to estimate the amount of data within a virtual space shared by other tasks, by using the shared work area designated within the virtual space. The presence and amount of shared data can thus be given at the time of designing sub-systems. A software designer provides such information prior to executing the present invention algorithm, so that it is not necessary to dynamically obtain such information. The present invention is particularly effective when applied to such a system which requires a higher system performance and has a number of tasks.

The terms to used herein will be described referring to FIG. 7. The following fact is assumed to have been given beforehand. Namely, of four tasks A20, B21, C22, and D23, the tasks A20 and B21 share the same data 220, and the tasks C22 and D23 share another same data 221. A concept "distance" is introduced which changes with the data amount shared by tasks. Tasks having a greater amount of shared data are considered that their distance is short. Using this distance, tasks are subject to clustering so that tasks are grouped on the cluster unit basis. It is assumed that the tasks A20 and B21 belong to a group 210, and the tasks C22 and D23 belongs to a group 211. The groups defined as above are called affinity groups.

If tasks of the same affinity group sequentially run on the same instruction processor, the same data in the buffer storage unit is used by the tasks thereby improving the use efficiency of the buffer storage unit.

FIG. 5 is a flow chart showing a pre-process of coupling a task requested to be executed by an instruction processor to the TCB queue. This process will be described sequentially one step after another. For accessing to or dealing with $T_B$ 104 and $I_B$ 103 of the task control block, control tables are provided. An example of the structure of the control table is shown in FIG. 8.

Described in a control table 400 for example is the information of tasks constituting an affinity group. As the entries of the table, there are provided a group identifier field 401, a field 403 for storing the number of tasks of the group present in the TCB queue, and pointer fields 404 to 407 to task control blocks.

(1) When a new task is to be allocated to an instruction processor, the control tables of affinity groups of the system are checked to identify an affinity group to which the task belongs. (Steps 1501, 1502, and 1504)

(2) If the new task belongs to one of the affinity groups of the system, the task is allocated to the same instruction processor to which other tasks of the same affinity group are allocated, in order to obtain a maximum performance of the buffer storage units. To this end, it is first checked whether there is any other task which belongs to the identified affinity group and is present in the TCB queue. In this embodiment, in order to speed up this check, the entry of the control table has the field 403 for storing the number of tasks of the affinity group present in the TCB queue. Therefore, this check is performed by confirming whether the number in the field 403 is 1 or more. (Step 1505)

(3) If there is another task belonging to the affinity group and present in the TCB queue, the new task is allocated to the instruction processor on which the other task was running, thereby improving the buffer storage efficiency. Specifically, the value of $I_B$ 103 in TCB of the other task is checked, and the same value is set as $I_B$ 103 of the new task. This new task is then stored at the last of the TCB queue as an executable task. The value $T_S$ 104 of the newly registered task may be the present time or $T_B$ 104 of the other task which run on $I_B$ 103. Upon registration of this task, the number in the field 403 of this affinity group is incremented by 1. (Steps 1506 and 1507)

(4) On the other hand, if there is no other task belonging to the affinity group and present in the TCB queue, i.e., if there is no other task waiting for execution by the system at that time, the new task can be executed by any desired instruction processor. In this case, a proper instruction processor is assigned the new task while considering the load condition of instruction processors. The value of $I_B$ 103 may take any desired number, and the stop time $T_S$ 104 is set to a value which is sufficiently longer than any other life times of buffer storage units. Upon registration of this task, the number in the field 403 of this affinity group is incremented by 1. (Steps 1509 and 1510)

(5) If the new task does not belong to any affinity group, the above-described process for an affinity group table is not executed at all, but only the values $I_B$ and $T_S$ are set in the same manner as described above. (Step 1503)

FIG. 6 is a flow chart showing a process to be carried out after a task execution. This termination process is to manage an affinity group control table, by which process the value in the corresponding one of the task number fields 403, 413, and 423 is decremented by 1. The process will be described one step after another, taking as an example the case where a task 30 is deleted from the control table 400 shown in FIG. 8.

(1) The control table of the affinity group to which the task 30 belongs, is read. The control table for this task 30 is the control table 400 shown in FIG. 8. (Steps 1601, 1602, 1605, and 1606)

(2) The value in the task number field 403 of the control table 400 is decremented by 1. (Step 1603)

(3) The pointer to the executed task is deleted from the control table. In this case, the table area is made small by filling the empty area if necessary. (Step 1604)

In the above manner, the task termination process of this embodiment is completed. This process is not necessary for the task which does not belong to any affinity group. In order to ensure integrity with other instruction processors when data is changed, this process should be performed while inhibiting an interruption and while performing an exclusive control if necessary.

As described previously, the embodiments do not use no additional information of a task read by using software or hardware in order to control the task scheduling. However, a more optimal control may be possible by taking into consideration, for example, a necessary memory size of a task, an access occurrence frequency to a shared space, the utilization of each instruction processor, and a hit ratio of each buffer storage unit. For example, if tasks requiring a small memory size are concentrated to a particular instruction processor, a control which reduces disturbances is possible.

Furthermore, in the above embodiment, although an affinity group is used only when registering a new task, it may be used also when selecting a ready task. In such a case, the process of FIG. 5 is added to the process of FIG. 1 with a modification of the latter process.

Still further, this invention is adaptable to buffer storage units with various control methods. Life time of data differ as the result of the control method. Furthermore, the present invention is not limited to the buffer storage unit having the structure shown in FIG. 2.

(II) 2nd Embodiment

Figures 10A, 10B:
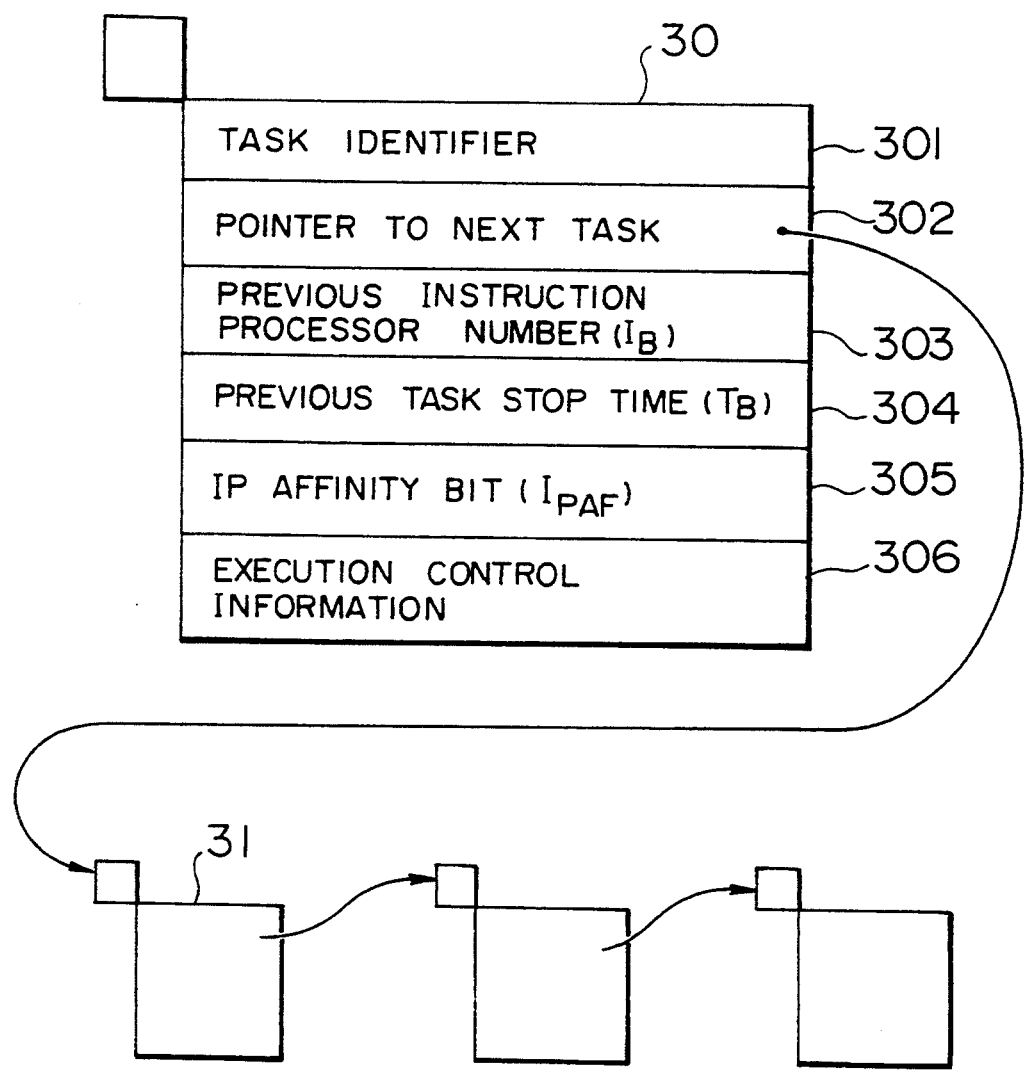
FIGS. 10A and 10B show the structure of a TCB queue of the second embodiment.

The second embodiment will be described with reference to the accompanying drawings. The arrangement of instruction processors is the same as the first embodiment shown in FIG. 2. FIG. 9 is a flow chart showing a process of clearing an IP affinity bit of this embodiment to 0. FIG. 10 shows the structure of a TCB queue of this embodiment. FIG. 11 is a flow chart showing a process of selecting a task according to this embodiment.

First, the principal control by the process of this embodiment will be described. Each task of a job is provided with a flag indicating whether the task is preferentially allocated to the task which previously executed the task. In allocating an executable task to an instruction processor, this flag is checked. If the flag is "1", the task is allocated to the instruction processor.

The flag is set to "1" when the task is stopped. The flag is reset to "0" after a long suspension time of the task when the reuse effect of data in the buffer storage unit of an instruction processor cannot be expected. The lapse time after a task was executed can be given by an instruction processor. Namely, an idle instruction processor checks the state of each task, and resets the flag of a task in excess of a predetermined lapse time, to "0". In this manner, the principal control of the process can be realized.

The process of resetting the flag to "0" is shown by the flow chart of FIG. 9. A program module containing this process is executed when there is no task to be allocated to an instruction processor or at a predetermined time interval set by a timer or the like. The pool structure of task control blocks is a queue structure similar to the first embodiment. This is called a TCB queue. The structure of a control block in the queue representative of the task state is shown in FIG. 10. Each control block 30 has the same structure as the first embodiment except that the flag is added. A bit indicating that the task is to be allocated to the instruction processor which previously executed the task, is called an IP affinity bit $I_{PAF}$305. This bit is set to "1" if it is can be considered that a sufficiently large amount of data to be used by the task remains in its BS. The IP affinity bit $I_{PAF}$305 is reset to "0" by checking the TCB queue in the following manner.

(1) A pointer is set to the top of the TCB queue. (Step 2001)

(2) If there is a task registered in the queue, then the process following Step 2003 is executed. If there is no task, then the process is terminated. (Step 2002)

(3) The IP affinity bit $I_{PAF}$ 305 Of the task control block 30 indicated by the pointer P is checked. If the bit is "0", no particular process is executed and the flow advances to Step 2007 at which the next task is checked. If the bit is "1", the process following Step 2004 is executed. (Step 2003)

(4) The previous execution stop time $T_B$ 304 of the task indicated by the pointer P is read. This stop time is compared with the present time $T_o$. If the difference between $T_o$ and $T_B$ is greater than a predetermined life time of BS specific to the system, then it is judged that the previous data does not remain within the BS and the IP affinity bit $I_{PAF}$ is reset to "0". On the other hand, if the difference between $T_o$ and $T_B$ is less than the life time, no particular process is executed for the task control block in concern. (Steps 2004, 2005, and 2006)

(5) After completing the process for the task control block indicated by the pointer, the pointer is set to the next task control block to check the next task. (Step 2007)

In the above manner, the IP affinity bit $I_{PAF}$ 305 is reset to "0". Next, a process of allocating a task with an IP affinity bit will be described one step after another with reference to FIG. 11.

(1) First, a pointer is set to the top of the TCB queue. An operation variable Cnt is initialized to 0. The objective of the operation variable is the same as the first embodiment. (Step 2101)

(2) The task control block 30 indicated by the pointer is checked. If the task is not executable, it cannot be selected and executed. In this case, the flow branches to a step of checking the next task. (Step 102)

(3) Next, from the task control block 30 indicated by the pointer, there are read the IP affinity bit $I_{PAF}$ 305 and the previous instruction processor number $I_B$ 303. (Step 2103)

(4) The previous instruction processor number $I_B$ 103 read at Step 2103 is compared with the number of the instruction processor now in concern. If they are the same, this task is selected and the flow branches to a task execution process. (Steps 2104 and 2108)

(5) If the comparison result at Step 2104 shows that both the numbers are different, the IP affinity bit $I_{PAF}$ 305 Of the task is checked. If the bit is "1", this task 30 is not selected and the flow advances to a process of checking the next task. The reason why this task is not selected is the same as the first embodiment. (Step 2105)

(6) The following steps are related to the next task without selecting the task at Step 2105. The number of checked tasks is first obtained from the operation variable Cnt. If the variable Cnt is greater than a preset upper limit of the check operation, then the task searching operation is terminated, and the executable task nearest to the top of the TCB queue is selected. The reasons for selecting the executable task nearest to the top of the TCB queue are the same as the first embodiment. (Steps 2106 and 2109)

(7) If there is no task to be checked, then the executable task nearest to the top of the queue is selected. The reasons for selecting the executable task nearest to the top of the queue are the same as the first embodiment. (Step 2107)

(8) The pointer is set to the next task, and the variable Cnt is incremented by 1. Thereafter, the steps starting from Step 2102 are repeated. (Step 2110)

The process of newly registering a task or deleting a task is the same as the first embodiment. The newly registered task is assigned the IP affinity bit "0".

(III) 3rd Embodiment

Figure 13:
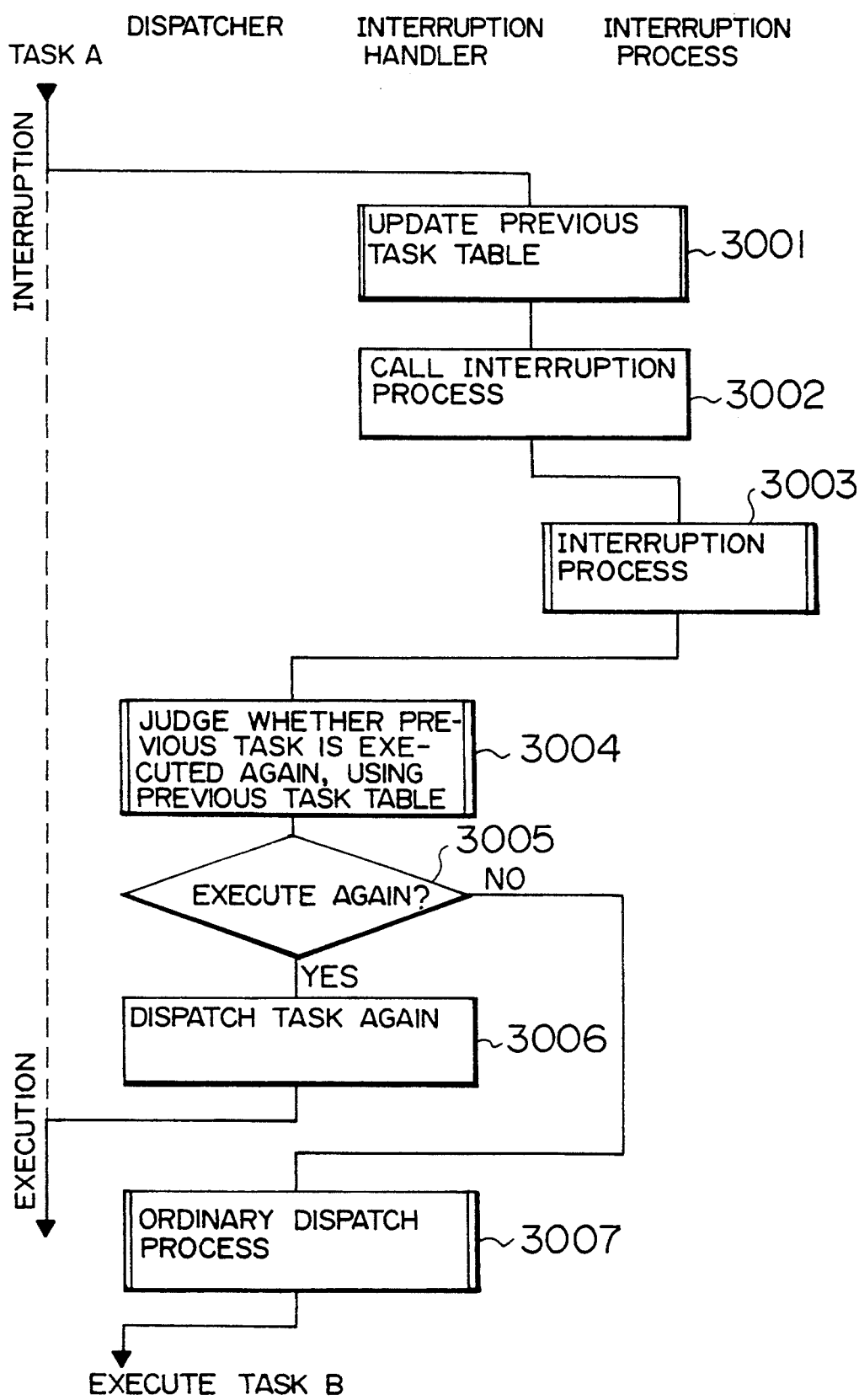
FIG. 13 is a flow chart showing a process of stopping a task upon occurrence of an interruption according to the embodiment.
Figure 14:
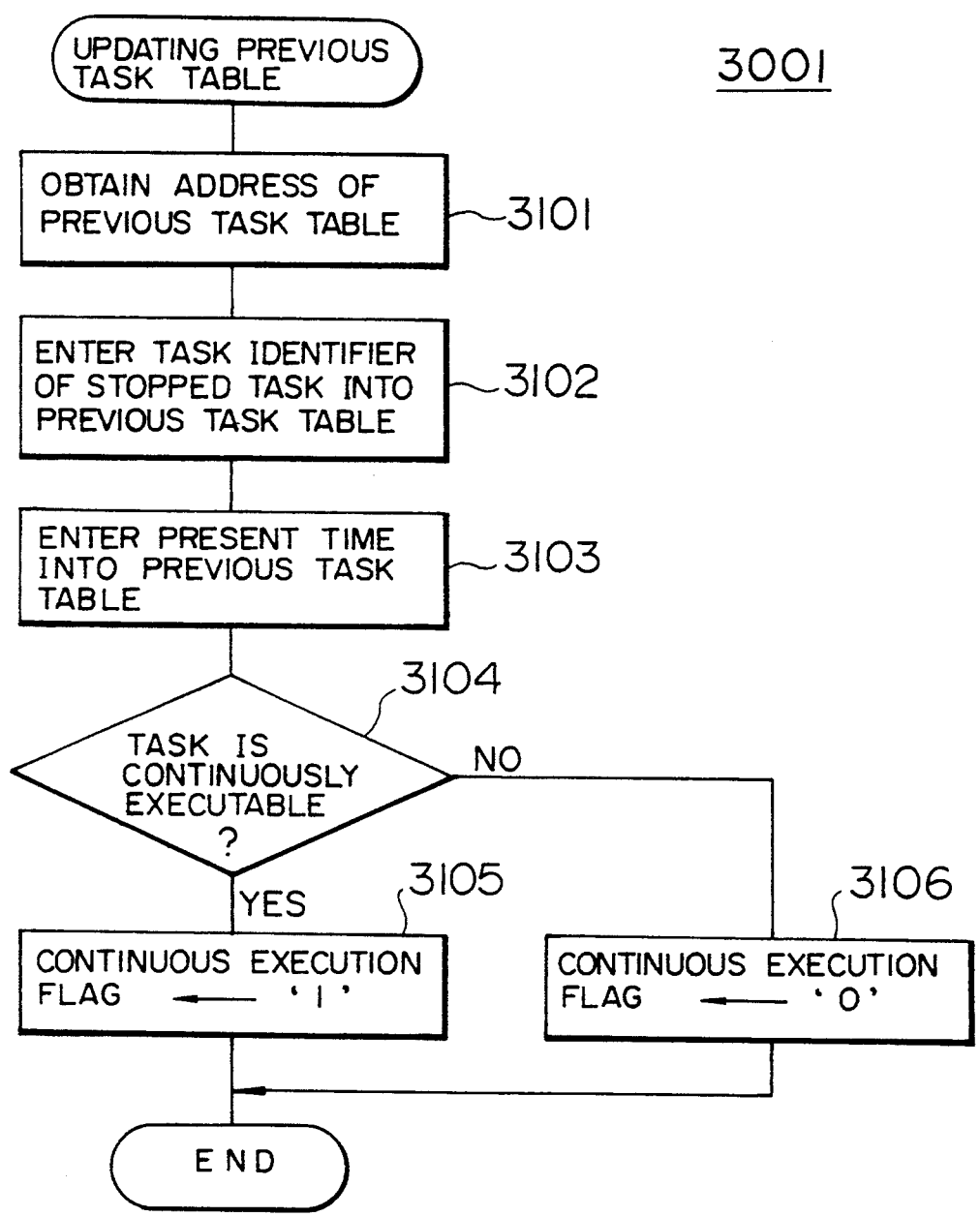
FIG. 14 is a flow chart showing a process of updating a previous task table.
Figure 15:
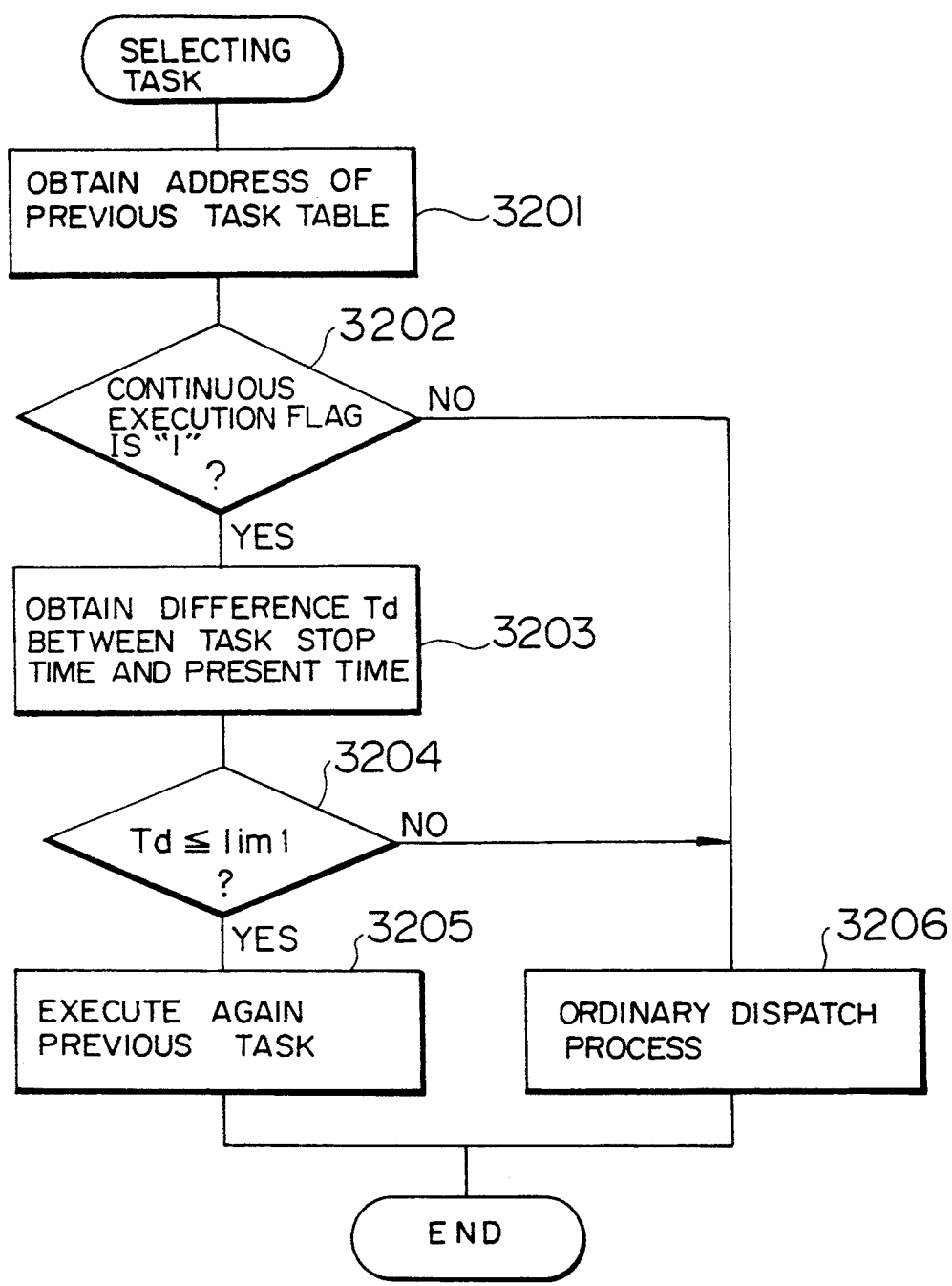
FIG. 15 is a flow chart showing a process of judging form the previous task table whether a task is executed again or not.
Figure 16:
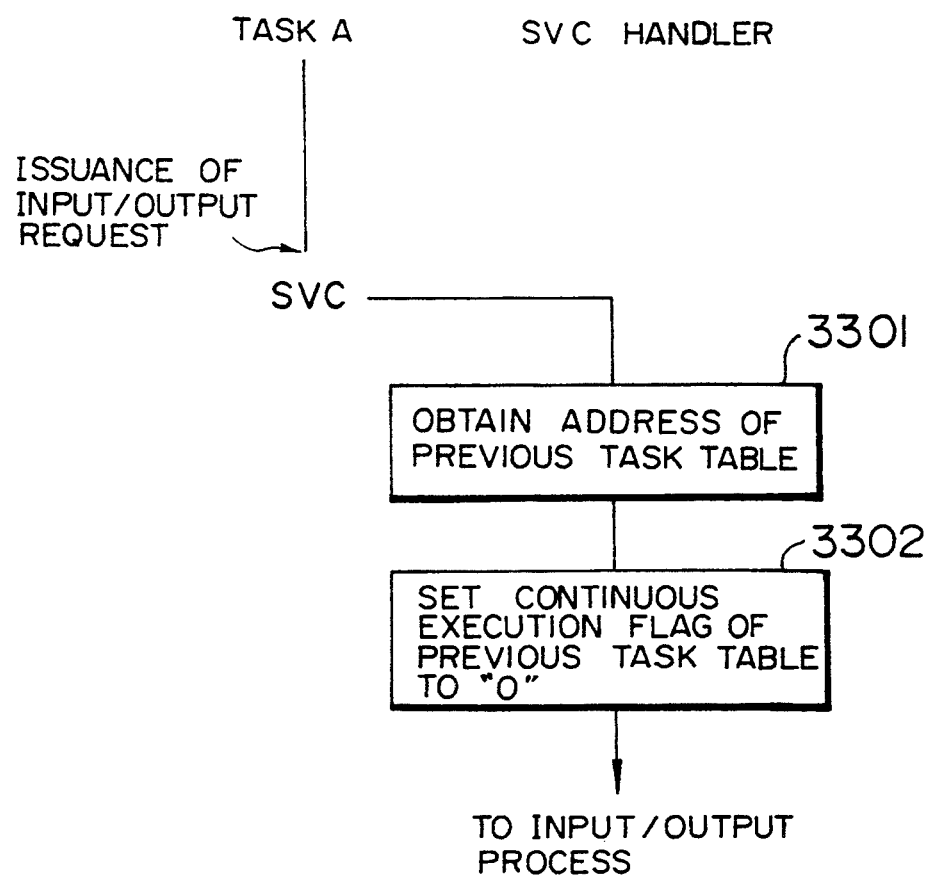
FIG. 16 is a flow chart showing a process of updating the previous task table when a task is stopped by an internal cause.

The arrangement and fundamental control of a system of the third embodiment are the same as the first embodiment. In this embodiment, the buffer storage efficiency is improved by judging whether a stopped task is again executed, and if executable, again executing it at the same instruction processor. In this case, the task scheduling by OS is not changed at all. FIGS. 12A to 12C are conceptual diagrams showing previous task tables according to the third embodiment. FIG. 13 is a flow chart showing a process of stopping a task upon occurrence of an interruption according to the embodiment. FIG. 14 is a flow chart showing a process of updating a previous task table. FIG. 15 is a flow chart showing a process of judging from the previous task table whether a task is executed again. FIG. 16 is a flow chart showing a process of updating the previous task table when a task is stopped by an internal cause.

In this embodiment, if a task is stopped at an instruction processor by an interruption or the like and if the interruption process time or the like is sufficiently short, then the interrupted task is again executed to improve the buffer storage efficiency.

In this embodiment, there is provided a work area 40 (hereinafter called a previous task table) within a main storage unit for each instruction processor. This previous task table 40 has the structure as shown in FIG. 12 and stores the following three data:

(a) a previous task identifier 401;
(b) a task stop time 402; and
(c) a flag 403 (hereinafter called a continuous execution flag) indicating whether the previous task can be continuously executed.

A process shown in FIG. 13 is performed in the following manner when a task A is stopped by an interruption or the like.

(1) When a task A10 is stopped by an interruption, the control is placed to an OS interruption handler. This interruption handler first performs a process of updating a previous task table 40. (Step 3001)

(2) Thereafter, a control program for an interruption process is activated to execute the interruption process. (Steps 3002 and 3003)

(3) After completion of the interruption process (after activation and completion of an interruption process module in the case of some OS), a process of reselecting a task is performed. In this case, it is checked from the previous task table if a lapse time from the task stop time is equal to or less than a predetermined threshold value. If equal to or less, the previous task is again executed while using the data remaining within its buffer storage unit. (Steps 3004 and 3005)

(4) If the lapse time is greater than the threshold value, the ordinary task scheduling is performed to select a task, e.g., a task B. (Step 3007)

Step 3001 of updating a previous task table and Step 3004 of judging re-execution will be described in more detail. The flow chart of FIG. 14 shows the detailed process at Step 3001 of updating a previous task table. Each step of this flow chart will be described.

(1) There is obtained an address of the previous task table for an instruction processor. (Step 3101)

(2) The task identifier and task stop time are set in the previous task table. (Steps 3102 and 3103)

(3) It is judged if the task can be continuously executed. If executable, "1" is set to the continuous execution flag, and if not executable, "0" is set. (Steps 3104, 3105, and 3106)

The process shown in FIG. 14 should be executed under the condition of inhibited interruption and exclusive control, when necessary.

FIG. 15 is a flow chart showing a process of judging from the previous task table whether a previous task is again executed. The process with be described one step after another.

(1) The previous task table for an instruction processor is read. (Step 3201)

(2) It is checked whether the task registered in the previous task table can be continuously executed. This check is conducted by confirming whether the continuous execution flag is "1" or not. (Step 3202)

(3) It is checked if a difference between the present time and the task stop time in the previous task table is less than a predetermined threshold value Lim 1. (Steps 3203 and 3204)

(4) If the difference is less than the threshold value, the previous task is executed again. (Step 3205)

(5) If the difference is equal to or more than the threshold value, an ordinary task dispatch process is performed. (Step 3206)

The threshold value used in this embodiment is determined in the similar manner as the first embodiment. The process shown in FIG. 15 should be executed under the condition of inhibited interruption and exclusive control, when necessary.

FIG. 16 is a flow chart showing a process to be executed after stopping a task A, in the case where the state of the task changed to a suspended state because it waits for synchronization with another task, or for an issuance of an I/O request. In this process, the previous task table is read (Step 3301). Then, the continuous execution flag 403 is reset to "0" (Step 3302). Thereafter, an ordinary task dispatch process is executed. SVC shown in FIG. 16 stands for a supervisor call instruction.

The third embodiment has been described above. In the third embodiment, as described previously, the OS task scheduling is not changed at all. Therefore, the task stop process shown in FIG. 13 may be used in combination with the task stop process described with the first embodiment.

(IV) 4th Embodiment

Figure 17:
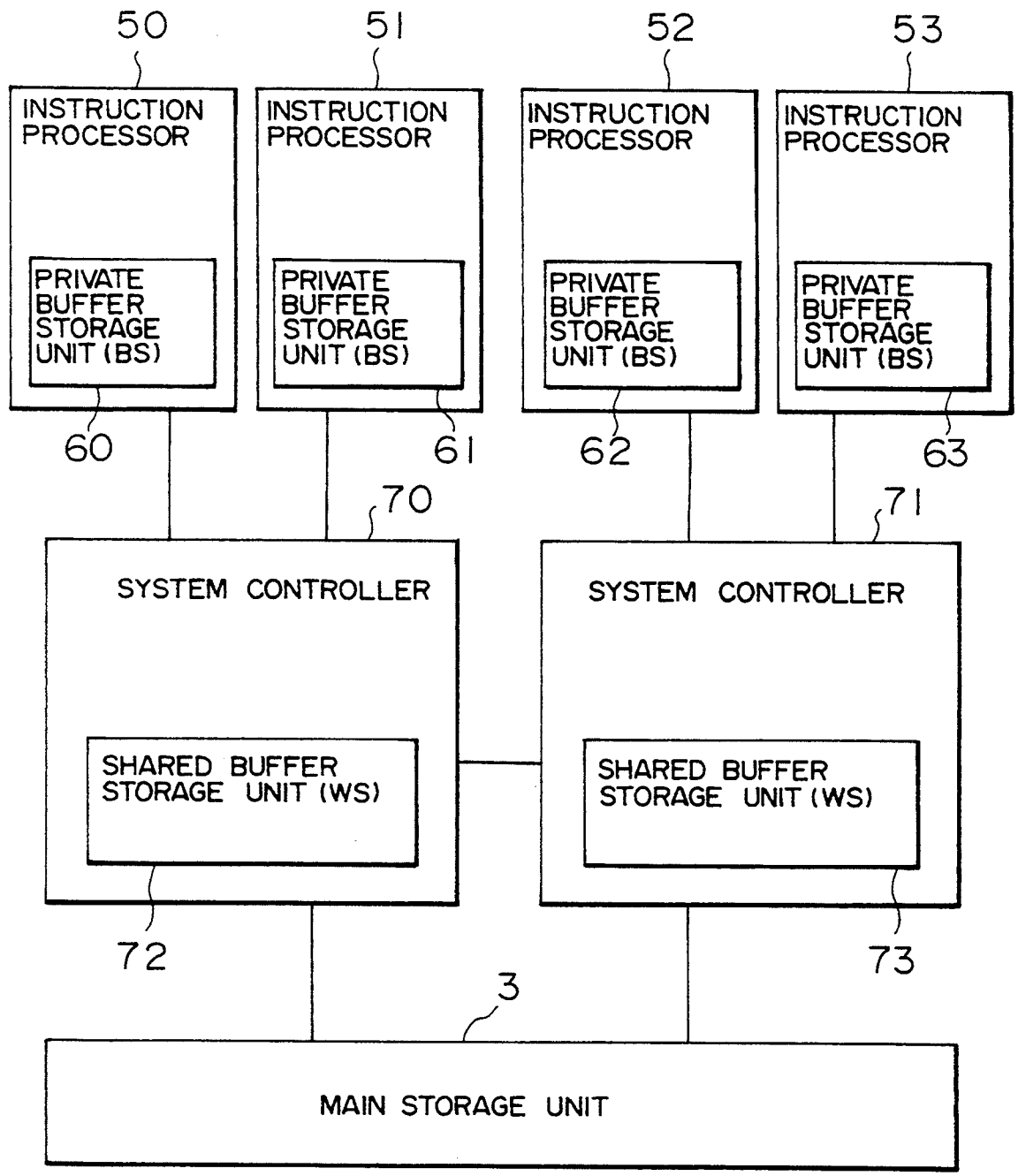
FIG. 17 shows the arrangement of a system according to the fourth embodiment of the present invention.
Figure 18:
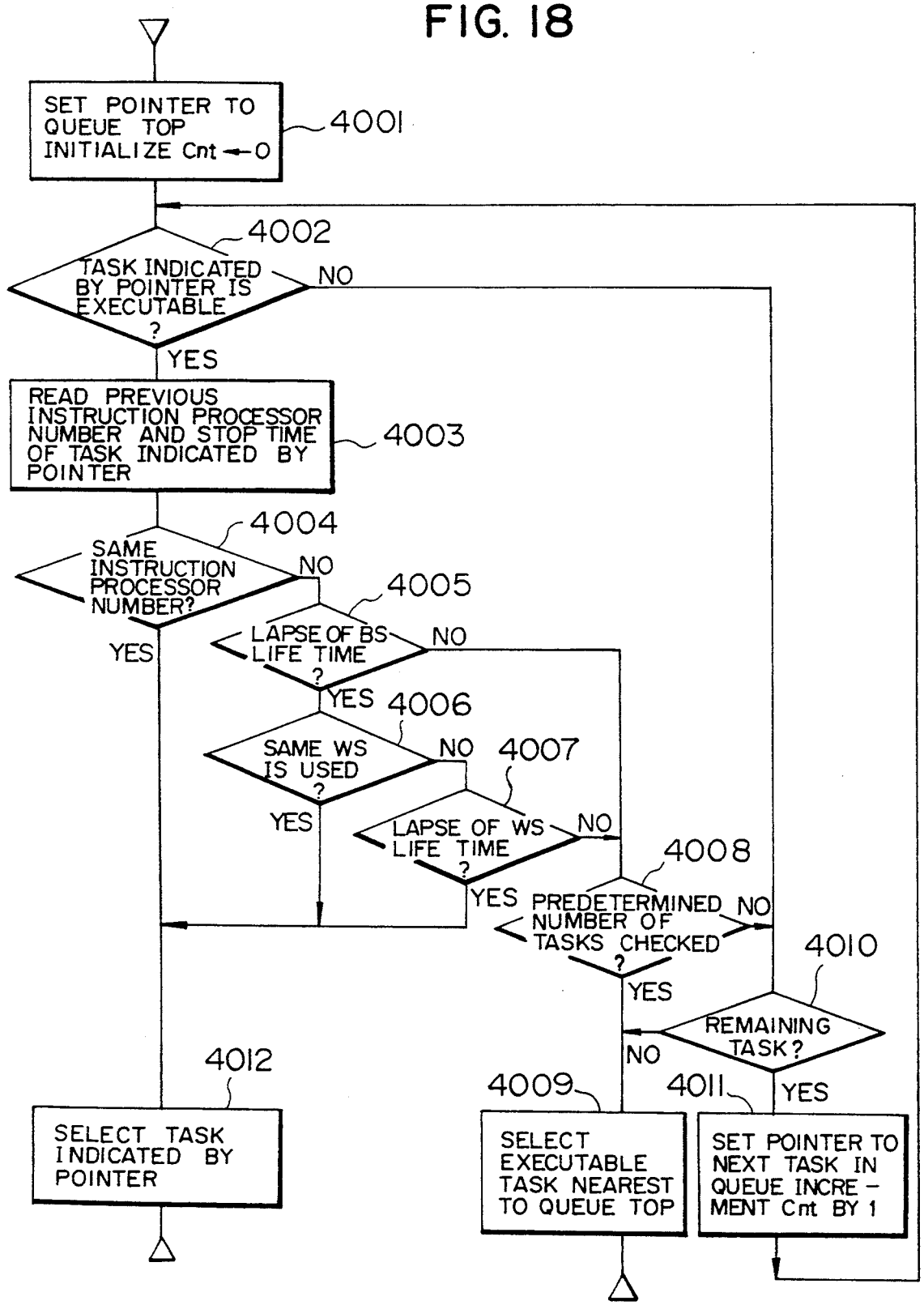
FIG. 18 is a flow chart showing a process of selecting a task according to the fourth embodiment.

In the fourth embodiment, a computer system shown in FIG. 17 and modified from the computer system of the first embodiment is used to execute the same process described in the first embodiment. FIG. 18 is a flow chart showing a task selecting process of the fourth embodiment.

The computer system of this embodiment has four instruction processors 50 to 53 each being provided with its own buffer storage unit (hereinafter called a BS). Two pairs of instruction processors 50 to 53 are connected to respective system controllers 70 and 71. The system controllers 70 and 71 have respective shared buffer storage units 72 and 73 (hereinafter called a WS) each being shared by the two pairs of instruction processors 50, 51, and 52, 53. The system controllers 70 and 71 are connected to a main storage unit 3. The buffer storage units having two hierarchic levels are controlled in the following manner.

The operations for BSs 60 to 63 of the instruction processors 50 to 53 are the same as BSs 4 and 5 of the first embodiment, so the description thereof is not duplicated. In the first embodiment, if an instruction or data requested by an instruction processor 50 is not present in BS, it is read from the main storage unit 3. In this embodiment, however, it is read from WS 72 of the system controller 70. The system controller 70 sends a requested block to BS 60 of the instruction processor 50, by executing a process described below. The instruction processor 50 registers the block transferred from the system controller 70 in BS 60, and continues to process an instruction by using the transferred data. The above-described operation is the same for the other instruction processors 51 to 53 and system controller 71.

Upon reception of a block transfer request from the instruction processor 50, the system controller 70 searches its WS 72. If the requested block is present within WS 72, it is sent to the requesting instruction processor 50. A process to be executed if the requested data is not present within WS 72, changes with a WS control method. In this embodiment, a control scheme which allows a plurality of copies to be stored in WS is used. An example of configuring a buffer storage unit using such a control scheme is described, for example, in U.S. Pat. No. 4,400,770 and U.S. Pat. No. 4,394,731. The process using such a control scheme will be described briefly.

(1) One of blocks within WS 72 of the instruction processor 70 is selected. This block is written back into the main storage unit 3 to change the data in the main storage unit 3 to the latest data. The block registered in WS 72 is deleted to thereby obtain an empty block within WS 72.

(2) WS 73 of the other instruction processor 73 (hereinafter called the other WS) is searched. If there is a block containing the requested data in the other WS 73, the contents of the block is transferred from the other WS 73 to the requesting WS 72. Then, the block in the other WS 73 is deleted. The transferred block is stored in the empty block area of the requesting WS 72. If there is no proper block in the other WS 73, the requested data is read from the main storage unit 3.

(3) After the above steps, the contents of the block read in the requesting WS 72 is transferred to the requesting instruction processor 50. The process is then terminated.

In the computer system of this embodiment having the above-described structure and being controlled in the manner described above, BSs 60 to 63 have an operation speed compatible with an instruction execution speed of their instruction processors, and WSs 72 and 73 have an operation speed slower than that of BSs 60 to 63 which speed is an intermediate between those of BS and main storage unit. In order to realize low cost and better performance of the computer system of this embodiment, it is preferable in many cases to use the structure that the total capacity of BSs be set to a capacity obtained by dividing the total capacity of WSs by several to several tens. With buffer storage units having different capacities, the block life time of WSs is longer than that of BSs by an amount corresponding to the capacity difference therebetween. The block life time is an average time period during which blocks in each BS or WS are assumed to be replaced with new blocks due to block transfer between BSs and WSs. Consider one set of blocks present at a certain time. The set of blocks are gradually changed to a new set of blocks as time lapses. The number of old blocks reduces generally monotonously. In order to efficiently improve the performance of a computer system having buffer storage units such as shown in FIG. 17, the utilization of buffer storage units is enhanced by reusing data in the buffer storage units and by reducing the number of data transfers between two hierarchical buffer storage units and between the main storage and buffer storage units, to thereby reduce data transfer overhead.

The task allocating process for the above-described system, corresponding to the first embodiment process of FIG. 1, will be described in detail with reference to FIG. 18.

The task state includes a running state, an executable or ready state, and a suspended state. The structure of a TCB queue used in this embodiment is the same as the first embodiment shown in FIGS. 4A and 4B.

Since the total capacity of WSs 72 and 73 is larger than that of BSs 60 to 63 by the amount in the order of one digit, generally the data of WS used by a stopped task and the data remaining after a certain time lapse from the task stop are large in amount. In view of this, different threshold values for a lapse time from the task stop time are given to BSs and WSs. If the stopped task is executed again within a time lapse indicated by the threshold values, there is selected an instruction processor which allows a reuse of data in BSs and WSs as much as possible.

The process shown in FIG. 18 will be described. An idle instruction processor selects one of executable tasks using the TCB queue in the following manner.

The process of selecting one of executable tasks will be described one step after another with reference to the flow chart of FIG. 18.

(1) First, a pointer is set to the top of the TCB queue. A work variable Cnt is initialized to 0. The objective of this variable is the same as described with the first embodiment. (Step 4001)

(2) The task control block identified by the pointer is checked. If the task is not executable or not ready, it cannot be selected and executed. In this case, the flow branches to a step of checking the next task. (Step 4002)

(3) Next, the fields of the previous task stop time $T_B$ 104 and the previous instruction processor number $I_B$ 103 are read from the task control block identified by the pointer. (Step 4003).

(4) The previous instruction processor number $I_B$ 103 read at Step 4003 is compared with the number of the instruction processor now in concern. If they are the same, this task is selected and the flow branches to a task execution process. (Steps 4004 and 4012)

(5) If the comparison result at Step 4004 shows that both the numbers are different, a difference between the present time and the previous task stop time $T_B$ 104 is checked. If the difference is equal to or less than a predetermined threshold value (Lim 1) determined from the life time of BS, this task is not selected and the flow advances to a process of checking the next task. The reason for not selecting such a task is the same as described with Step 1005 of the first embodiment. (Step 4005)

(6) If the difference checked at Step 4005 is greater than the threshold value of BS life time, it is then checked whether the instruction processor identified by $I_B$ 103 is connected to the same system controller as that of the idle instruction processor. If the idle instruction processor is being connected to the same system controller, the task identified by the pointer is selected. (Step 4006)

(7) If the check result at Step 4006 shows that the idle instruction processor is not connected to the same system controller, a difference between $T_B$ 104 and the present time $T_o$ is compared with another preset threshold value (Lim 2, Lim 1 < Lim 2) of WS life time. If the difference between $T_B$ and $T_o$ is greater than the WS life time threshold value, the buffer storage effect of WSs cannot be expected so much, and so there is no significant performance difference even if the task is executed by any optional instruction processor. In this process, in order to prevent suspension of task, the task indicated by the pointer at that time is selected. If the difference between $T_B$ and $T_o$ is less than the WS life time threshold value, the task is not selected, and the flow branches to a process of checking the next task. (Step 4007)

(8) The following steps are related to checking the next task without selecting the task at Steps 4006 and 4007. The number of checked tasks is first obtained from the variable Cnt. If the variable Cnt is equal to or more than a preset upper limit Clim of the check number, then the task searching operation is terminated, and the executable task at the top of "ready-to-go" queue is selected. The reasons for selecting the executable task nearest to the top of the TCB queue are the same as the first embodiment. (Steps 4008 and 4009)

(9) If there is no task to be checked, then the executable task nearest to the top of the queue is selected. The reasons for selecting the executable task nearest to the top of the queue are the same as those described above. (Step 4010)

(10) The pointer is set to the next task, and the variable Cnt is incremented by 1. Thereafter, the steps starting from Step 4002 are repeated. (Step 4011)

The steps of the flow chart shown in FIG. 16 have been described. In the above process, there is no execution priority order between tasks. The execution priority order may be easily realized, for example, by providing a TCB queue for each priority order.

The process of newly registering a task or deleting a task is the same as the first embodiment.

In determining the threshold values (Lim 1, Lim 2) of BS and WS life times, like points to those of the first embodiment should be taken into consideration.

In the four embodiments described above, a tightly coupled multiprocessor system shown in FIGS. 2 and 17 is used by way of example. Also in a loosely coupled multiprocessor system (having disks for shared data), the similar problems will occur during buffering at a shared data area with data being written thereto. In this case, in order to apply the present invention to such a system, the main storage unit 3 of the first embodiment is used as a shared data area. Only point to be considered in this case is how a life time of buffer storage data is determined.

Various modifications and hardware supports are possible for the present invention. For example, a part of the task dispatcher described in the embodiment may be written using microcodes.

Information of hardware, for example, the data amount of a buffer storage unit, may be provided to select a dispatch task in accordance with the data amount. In a system implemented as purging buffer storage data when address space is changed, simply assuming that data to be used by a subject task does not remain at the instruction processor after another task runs on the address space different from that of the subject task, a new instruction processor may be assigned the subject task. A more complicated modification may be realized using suitable hardware supports.

The present invention concerns the technique of improving the system throughput by enhancing the utilization efficiency of buffer storage units. Since there is a tendency that a particular task is executed repeatedly, there is a possibility of degrading a task response. In a system giving prominence to a task response, a priority order between tasks may be introduced to improve the task response by giving a higher priority to a task not receiving services. Furthermore, this invention may be used in combination with a conventional method, such as activating a conventional dispatch method at an interval of once per several executions of the present invention method.

Still further, some similarity between tasks may be utilized in order to dispatch these tasks efficiently, not only affinity groups described above.

It is to be noted that the present invention does not exclude the above-described various modifications.

In the computer system having buffer storage units according to the present invention, it is possible to improve a buffer storage efficiency and hence the system performance for the case where a task is changed or a task is newly registered to the system.

We claim:

1. In a computer system having a main storage unit and a plurality of instruction processors each having a buffer storage unit, said buffer storage unit having a copy of a part of said main storage unit and deleting a part of said copy when reading a main storage unit area not stored in said buffer storage unit, a task scheduling method for a multiprocessor, comprising the steps of:

providing each task control block of a task control block queue with an area for storing processor identification of an instruction processor which executes a task and an area for storing evaluation information for evaluating a copied data amount for said task, remaining in said buffer storage unit of said instruction processor executing said task;

causing said instruction processor to register said processor identification and said evaluation information in said task control block when execution of said task is stopped; and when selecting a task to be executed by a subject instruction processor from a plurality of tasks to be executed in said computer system, causing said subject instruction processor to sequentially read said task control blocks in said task control block queue to check each task in accordance with said processor identification and said evaluation information, and if a checked result shows that said copied data amount corresponding to a checked task and remaining in said buffer storage unit of said instruction processor is greater than a predetermined amount, causing said subject instruction processor not to select said checked task and allowing another instruction processor to select said checked task.

2. A task scheduling method for a multiprocessor according to claim 1, wherein said plurality of instruction processors has at least one second buffer storage unit which are shared by some or all of said instruction processors.

3. A task scheduling method for a multiprocessor according to claim 1, wherein said evaluation information is a time when execution of said task is stopped, and said check is made based upon a difference between (the difference between said time stored as said evaluation information and a present time) and (a predetermined value).

4. A task scheduling method for a multiprocessor according to claim 1, wherein tasks using a large amount of shared data are collected as one task group, and said task control block queue comprises said one task group and other tasks not belonging to any task group.

5. A task scheduling method according to claim 1, wherein a work area is provided in said main storage unit for each instruction processor, and when execution of a task is stopped by an interruption, said instruction processor stores in said work area evaluation information at a time of said interruption and flag information indicating whether a stopped task can be continuously executed, and after completion of an interruption process, said instruction processor continuously executes said stopped task under a condition that said flag information in said work area indicates that said stopped task can be continuously executed and an evaluation result based upon said evaluation information indicates that said copied data amount for said stopped task remaining in said buffer storage unit is larger than a predetermined amount, and under an opposite condition, said instruction processor performs a process of checking each task to be executed from a plurality of tasks to be executed in said computer system.

6. In a computer system having a main storage unit and a plurality of instruction processors each having a buffer storage unit, said buffer storage unit having a copy of a part of said main storage unit and deleting a part of said copy when reading a main storage unit area not stored in said buffer storage unit, a task scheduling method for a multiprocessor, comprising the steps of:

providing each task control block of a task control block queue with an area for storing processor identification of an instruction processor which executes a task and an area for storing evaluation information for evaluating a copied data amount for said task, remaining in said buffer storage unit of said instruction processor executing said task;

causing said instruction processor to register said processor identification and said evaluation information in said task control block when execution of said task is stopped; and when selecting a task to be executed by a subject instruction processor from a plurality of tasks to be executed in said computer system, causing said subject instruction processor to sequentially read said task control blocks in said task control block queue to check each task in accordance with said processor identification and said evaluation information, and if said processor identification in said task control block and corresponding to a checked task is the same as a subject processor identification of said subject instruction processor, causing said subject instruction processor to select said checked task, if said processor identification is not the same as said subject processor identification of said subject instruction processor, performing evaluation using said evaluation information in said task control block, and if an evaluation result shows that said copied data amount corresponding to said checked task and remaining in said buffer storage unit of said instruction processor is greater than a predetermined amount, causing said subject instruction processor not to select said checked task and allowing said instruction processor to select said checked task, and causing said subject instruction processor to perform a process of checking a next task.

7. A task scheduling method for a multiprocessor according to claim 6, wherein said plurality of instruction processors has at least one second buffer storage unit which are shared by some or all of said instruction processors.

8. A task scheduling method for a multiprocessor according to claim 6, wherein said evaluation information is a time when execution of said task is stopped, and said Check is made based upon a difference between (the difference between said time stored as said evaluation information and a present time) and (a predetermined value).

9. A task scheduling method for a multiprocessor according to claim 6, wherein tasks using a large amount of shared data are collected as one task group, and said task control block queue comprises said one task group and other tasks not belonging to any task group.

10. A task scheduling method according to claim 6, wherein a work area is provided in said main storage unit for each instruction processor, and when execution of a task is stopped by an interruption, said instruction processor stores in said work area evaluation information at a time of said interruption and flag information indicating whether a stopped task can be continuously executed, and after completion of an interruption process, said instruction processor continuously executes said stopped task under a condition that said flag information in said work area indicates that said stopped task can be continuously executed and an evaluation result based upon said evaluation information indicates that said copied data amount for said stopped task remaining in said buffer storage unit is larger than a predetermined amount, and under an opposite condition, said instruction processor performs a process of checking each task to be executed from a plurality of tasks to be executed in said computer system.

11. In a computer system having a main storage unit and a plurality of instruction processors each having a buffer storage unit, said buffer storage unit having a copy of a part of said main storage unit and deleting a part of said copy when reading a main storage unit area not stored in said buffer storage unit, a task scheduling method for a multiprocessor, comprising the steps of:

providing each task control block of a task control block queue with an area for storing processor identification of an instruction processor which executes a task, an area for storing evaluation information for evaluating a copied data amount for said task, remaining in said buffer storage unit of said instruction processor executing said task, and an area for storing a flag representative of an evaluation result;

causing said instruction processor to register said processor identification and said evaluation information in said task control block when execution of said task is stopped;

causing an idle instruction processor in an idle state to sequentially read said task control blocks in said task control block queue to evaluate each task by comparing said copied data amount for said each task remaining in said buffer storage unit with a predetermined amount in accordance with said evaluation information within a read said task control block, and causing said idle instruction processor to write said evaluation result in said flag area; and when selecting a task to be executed by a subject instruction processor from a plurality of tasks to be executed in said computer system, causing said subject instruction processor to sequentially read said task control blocks in said task control block queue to check each task, if said processor identification in said read task control block and corresponding to a checked task is the same as a subject processor identification of said subject instruction processor, causing said subject instruction processor to select said checked task, if said processor identification is not the same as said subject processor identification of said subject instruction processor, referring to said evaluation result represented in said flag area in said read task control block and corresponding to said checked task, and if said evaluation result is small, causing said subject instruction processor to select said checked task, and if said evaluation result is large, causing said subject instruction processor not to select said checked task and allowing another instruction processor to select said checked task, and causing said subject instruction processor to perform a process of checking a next task.

12. In a computer system having a main storage unit, a plurality of system controllers connected to said main storage unit, each of said system controllers having a shared buffer storage unit, and a plurality of instruction processors connected to said system controllers, each of said instruction processors having a buffer storage unit, said shared buffer storage unit having a copy of a part of said main storage unit, and said buffer storage unit having a copy of a part of said shared buffer storage unit, a task scheduling method for a multiprocessor, comprising the steps of:

providing each task control block of a task control block queue with an area for storing a processor identification of an instruction processor which executes a task, and an area for storing evaluation information for evaluating a copied data amount for said task remaining in said buffer storage unit of said instruction processor executing said task;

causing said instruction processor to register said processor identification and said evaluation information in said task control block when execution of said task is stopped; and when selecting a task to be executed by a subject instruction processor from a plurality of tasks to be executed in said computer system, causing said subject instruction processor to sequentially read said task control blocks in said task control block queue to check each task, if said processor identification in a read said task control block and corresponding to a checked task is the same as a subject processor identification of said subject instruction processor, causing said subject instruction processor to select said checked task, if said processor identification is not the same as said subject processor identification of said subject instruction processor, evaluating said checked task using said evaluation information in said task control block to determine if a value of an evaluation result is smaller than a predetermined first threshold value and if said copied data amount of said checked task remaining in said buffer storage unit of said instruction processor is greater than a predetermined amount, and if said evaluation result value is larger than said first threshold value, causing said subject instruction processor to select said checked task if (said instruction processor uses a same shared buffer storage unit as said subject instruction processor), and causing said subject instruction processor to select said checked task if (said instruction processor does not use said same shared buffer storage unit and if said evaluation result value is larger than a predetermined second threshold value), and if (said other instruction processor does not use said same shared buffer storage unit and said evaluation result value is smaller than said second threshold value), causing said subject instruction processor not to select said checked task, and causing said subject instruction processor to perform a process of checking a next task.

* * * * *